United States Patent
Galisultanov et al.

(10) Patent No.: US 12,372,457 B2
(45) Date of Patent: Jul. 29, 2025

(54) OPTIMIZED INFRARED LIGHT SOURCE FOR A GAS SENSOR, AND MANUFACTURING METHOD THEREOF

(71) Applicant: ELICHENS, Grenoble (FR)

(72) Inventors: Ayrat Galisultanov, Grenoble (FR); Hélène Duprez, Grenoble (FR)

(73) Assignee: ELICHENS, Grenoble (FR)

( * ) Notice: Subject to any disclaimer, the term of this patent is extended or adjusted under 35 U.S.C. 154(b) by 96 days.

(21) Appl. No.: 18/248,358

(22) PCT Filed: Oct. 7, 2021

(86) PCT No.: PCT/EP2021/077795
§ 371 (c)(1),
(2) Date: Apr. 7, 2023

(87) PCT Pub. No.: WO2022/074169
PCT Pub. Date: Apr. 14, 2022

(65) Prior Publication Data
US 2023/0296499 A1 Sep. 21, 2023

(30) Foreign Application Priority Data
Oct. 10, 2020 (FR) ...................................... 2010377

(51) Int. Cl.
*G01N 21/25* (2006.01)
*G01N 21/3504* (2014.01)

(52) U.S. Cl.
CPC ....... *G01N 21/255* (2013.01); *G01N 21/3504* (2013.01); *G01N 2201/061* (2013.01)

(58) Field of Classification Search
CPC ............. G01N 21/255; G01N 21/3504; G01N 2201/061; G01N 2201/06186;
(Continued)

(56) References Cited

U.S. PATENT DOCUMENTS

| 5,026,992 A | 6/1991 | Wong |
| 5,285,131 A | 2/1994 | Muller et al. |

(Continued)

FOREIGN PATENT DOCUMENTS

| EP | 1612540 A1 | 1/2006 |
| WO | 2007/064370 A2 | 6/2007 |

(Continued)

OTHER PUBLICATIONS

International Search Report for International Application No. PCT/EP2021/077795, mailed Dec. 9, 2021, 6 pages with English translation.

(Continued)

*Primary Examiner* — Tarifur R Chowdhury
*Assistant Examiner* — Akbar H. Rizvi
(74) *Attorney, Agent, or Firm* — TraskBritt

(57) ABSTRACT

An infrared light source includes an emitting element extending as a radial plane about the emitting element's center and configured to heat up to emit infrared light. The emitting element lies in a cavity bounded by a cover, placed facing the emitting element. The cover has internal and external faces, the internal face facing the emitting element, and the external face defining an interface between the cover and a medium outside the light source. The cover occupies, parallel to a transverse axis perpendicular to the radial plane, a thickness, between the internal and external faces. The external face includes a planar central portion and at least one peripheral portion adjacent and inclined respective to the central portion. The planar central portion extends about the external face's center. In the peripheral portion, the cover's thickness decreases as a function of a distance from the central portion.

20 Claims, 19 Drawing Sheets

(58) Field of Classification Search
CPC ...... G01N 21/031; G01J 3/0205; G01J 3/108; G01J 3/42; H01K 1/14; H01K 7/02; H01S 5/423; G05B 2219/36221
See application file for complete search history.

(56) References Cited

U.S. PATENT DOCUMENTS

| | | |
|---|---|---|
| 10,386,298 B2 | 8/2019 | Barritault et al. |
| 2013/0265568 A1* | 10/2013 | Micheels .......... G01N 21/3577 356/51 |
| 2015/0192517 A1 | 7/2015 | Andre |
| 2021/0055212 A1 | 2/2021 | Duprez |

FOREIGN PATENT DOCUMENTS

| | | |
|---|---|---|
| WO | 2018/162848 A1 | 9/2018 |
| WO | 2019/081838 A1 | 5/2019 |

OTHER PUBLICATIONS

International Written Opinion for International Application No. PCT/EP2021/077795, mailed Dec. 9, 2021, 14 pages with English Machine Translation.

* cited by examiner

OPTIMIZED INFRARED LIGHT SOURCE FOR A GAS SENSOR, AND MANUFACTURING METHOD THEREOF

CROSS-REFERENCE TO RELATED APPLICATIONS

This application is a national phase entry under 35 U.S.C. § 371 of International Patent Application PCT/EP2021/077795, filed Oct. 7, 2021, designating the United States of America and published as International Patent Publication WO 2022/074169 A1 on Apr. 14, 2022, which claims the benefit under Article 8 of the Patent Cooperation Treaty to French Patent Application Serial No. 2010377, filed Oct. 10, 2020.

TECHNICAL FIELD

The present disclosure relates to an infrared light source notably intended to be used in a gas sensor.

BACKGROUND

It is quite common to use optical methods to analyze a gas. Devices allow the composition of a gas to be determined based on the fact that the species from which a gas is composed have spectral absorption properties that are different from one another. Thus, if an absorption spectral band of a gas species is known, the concentration of the latter may be determined based on an estimation of the absorbance of the light passing through the gas, using the Beer-Lambert law. This principle allows the concentration of a gas species present in the medium to be estimated.

The light source is usually a source emitting in the infrared, the method used usually being designated NDIR detection, NDIR being the acronym of nondispersive infrared. Such a principle has been frequently implemented, and is, for example, described in many documents, for example, in U.S. Pat. No. 5,026,992 or WO2007064370.

In the commonest methods, the analyzed gas lies between a light source and a photodetector referred to as the measuring photodetector, the latter being intended to measure a light wave transmitted by the gas to be analyzed, and partially absorbed by the latter. These methods generally comprise a measurement of a light wave, referred to as the reference light wave, emitted by the source, and not absorbed by the analyzed gas.

Comparing the light wave in the presence of gas and the light wave without gas allows the gas to be characterized. It is, for example, a question of determining an amount of a gas species in the gas, in the case of the technology referred to as "absorption-based NDIR." It may also be a question of estimating a number of particles in the gas, by detecting light scattered by the latter in a predetermined angular range of scatter.

To design an NDIR sensor, it is common to use a light source taking the form of an incandescent filament. This type of light source is inexpensive and has a spectral emission close to that of a black body.

Examples of gas sensors have been described in documents WO2018162848 and WO2019081838. These sensors comprise an enclosure intended to be occupied by the gas to be analyzed. Conventionally, the enclosure is bounded by reflective walls. As light travels between the light source and a photodetector, it may undergo many reflections off the reflective walls.

The inventors have designed a light source that is particularly suitable for integration into NDIR gas sensors, and, for example, into the sensors described in the documents cited above. The light source designed by the inventors allows the amount of light detected by the photodetector to be increased. The inventors also provide a production process that is simple to implement, and that allows an optimized light source to be obtained.

BRIEF SUMMARY

A first subject of the present disclosure is an infrared light source, notably for a gas sensor, comprising:
- an emitting element, extending as a radial plane, about a center of the emitting element, the emitting element being configured to heat up, the heating leading to an emission of infrared light;
- a cavity, in which the emitting element lies, the cavity being bounded by a cover, placed facing the emitting element, the cover having an internal face, placed facing the emitting element, and an external face, defining an interface between the cover and a medium outside the light source; and
- the cover occupying, parallel to a transverse axis, perpendicular to the radial plane, a thickness, between the internal face and the external face;
- the light source being characterized in that:
- the external face comprises
  - a planar central portion, extending about a center of the external face, the center of the external face preferably being aligned with the center of the emitting element, along the transverse axis; and
  - at least one peripheral portion, adjacent to the central portion, the peripheral portion being inclined with respect to the central portion by an angle of inclination,
- such that, in the peripheral portion, the thickness of the cover decreases as a function of a distance from the central portion.

The peripheral portion may lie on either side of the central portion.

The emitting element may be a membrane. The emitting element may be traversed by a conductive track, such that under the effect of an electric current flowing through the conductive track, the light-emitting element heats up.

According to one embodiment, the central portion preferably lies parallel to the radial plane.

The peripheral portion is preferably inclined, with respect to the central portion, by an angle of inclination comprised between 5° and 30°, and preferably comprised between 5° and 25° or between 5° and 20°.

According to one embodiment:
- the central portion lies parallel to a radial longitudinal axis and to a lateral axis, the longitudinal axis being perpendicular to the lateral axis;
- the peripheral portion lies parallel to a first longitudinal axis and to a first lateral axis;
- the first longitudinal axis is inclined, by the angle of inclination, with respect to the longitudinal axis; and
- the first lateral axis is parallel to the lateral axis.

According to one possibility, the light source comprises a second peripheral portion, adjacent to the central portion, such that:
- the second peripheral portion lies parallel to a second longitudinal axis and a second lateral axis;
- the second lateral axis is inclined, by a second angle of inclination, with respect to the lateral axis; and the second longitudinal axis is parallel to the longitudinal axis.

The second peripheral portion may lie on either side of the central portion.

According to one embodiment, the peripheral portion extends a length comprised between 100 µm and 600 µm, on either side of the central portion, this length being measured along the longitudinal axis or along the lateral axis. More generally, the peripheral portion may extend a length comprised between 5% and 50% of the length of the cover, this length being measured along the longitudinal axis and/or along the lateral axis.

According to one embodiment, at least one peripheral portion, or even each peripheral portion, is inclined, with respect to the central portion, by various angles of inclination, the angles of inclination increasing with distance from the central portion.

Preferably, the central portion is centered with respect to the emitting element, along the transverse axis.

The external face may extend, along an axis parallel to the radial plane, a length comprised between 500 µm and 2500 µm.

A second subject of the present disclosure is a gas sensor, comprising an enclosure configured to contain a gas, a light source and at least one photodetector, the light source being configured to emit light radiation that propagates, through the enclosure, to the photodetector, the light source being a light source according to the first subject of the present disclosure.

The gas sensor may be such that the enclosure is bounded by at least a first reflective wall, which lies perpendicular to the radial plane of the light source, parallel to the transverse axis.

The gas sensor may be such that the external face of the cover of the light source comprises a planar central portion, extending as a plane parallel to the radial plane and passing through the center of the external face, and wherein:
 the central portion lies parallel to a longitudinal axis and to a lateral axis, the longitudinal axis preferably being perpendicular to the lateral axis;
 the peripheral portion lies parallel to a first longitudinal axis and to a first lateral axis;
 the first longitudinal axis is inclined, by an angle of inclination, with respect to the longitudinal axis; and
 the first lateral axis is parallel to the lateral axis;
 the light source being arranged such that the longitudinal axis is perpendicular to the first reflective wall.

The gas sensor may be such that the enclosure is bounded by a second reflective wall, lying parallel to the first reflective wall, the light source lying between the two reflective walls. It is then preferable for the peripheral portion to lie on either side of the central portion.

A third subject of the present disclosure is a process of producing a light source forming the subject of the first embodiment, comprising:
 a) obtaining a light source, the light source comprising an emitting element, lying parallel to a radial plane, and placed in a cavity bounded by a cover, the cover extending between an internal face, placed facing the emitting element, and an external face, the external face lying parallel to the radial plane, about a center, the distance between the internal face and the external face defining a thickness of the cover; and
 b) machining the external face, so as to form, in the external face, at least one peripheral portion, adjacent to a planar central portion, passing through the center of the external face, and parallel to the radial plane, the peripheral portion being inclined with respect to the central portion such that, in the peripheral portion, the thickness of the cover decreases as a function of a distance from the center of the external face.

The process may comprise, in step b), forming a plurality of peripheral portions, which respectively extend from the central portion, and which are inclined with respect to a plane parallel to the radial plane and passing through the center of the external face.

The machining may comprise applying a cutting tool comprising a blade that is inclined with respect to the radial plane, against the external face of the cover.

The process may comprise translating the cutting tool with respect to the external face.

The process may comprise successively using a plurality of cutting tools, each cutting tool comprising a blade that is inclined with respect to the radial plane by one angle of inclination, the angles of inclination of two different cutting tools being different.

The process may be such that:
 step a) comprises obtaining a plurality of light sources, such that the respective emitting elements of each light source are coplanar, and extend into one cavity, respectively, the respective cavities of each light source being bounded by the same cover, each cavity being centered with respect to a center of the external face; and
 step b) is implemented about each center of the external face, so as to form, beside each center, at least one peripheral portion, adjacent to a planar central portion, passing through the center of the external face, and parallel to the radial plane, the peripheral portion being inclined with respect to the central portion such that, in the peripheral portion, the thickness of the cover decreases as a function of a distance from the center of the external face.

A fourth subject of the present disclosure is a process of producing a light source forming the subject of the first embodiment, comprising:
 i. obtaining a basic light source, the basic light source comprising an emitting element that extends, parallel to a radial plane, about a center of the emitting element, and that is placed in a cavity bounded by a basic cover, the basic cover extending between an internal face, placed facing the emitting element, and a first face, the first face of the basic cover lying parallel to the radial plane;
 ii. obtaining an auxiliary cover, extending between a second face and an external face, the distance between the second face and the external face defining a thickness of the auxiliary cover, the external face comprising a center of the external face;
 iii. machining the external face of the auxiliary cover, so as to form, in the external face, at least one peripheral portion, adjacent to a planar central portion, the central portion passing through the center of the external face, and being parallel to the second face, the peripheral portion being inclined with respect to the central portion such that, in the peripheral portion, the thickness of the auxiliary cover decreases as a function of a distance from the center of the external face; and
 iv. assembling the auxiliary cover against the basic cover, the second face making contact with the first face, the assembly being carried out in such a way that the center of the external face is aligned with the center of the emitting element, parallel to a transverse axis perpendicular to the radial plane.

According to the fourth subject of the present disclosure, the process may comprise:

in step i), obtaining a plurality of basic light sources, distributed in the radial plane, each basic light source comprising an emitting element that extends, parallel to a radial plane, about a center of the emitting element, and that is placed in a cavity bounded by a basic cover, the basic cover extending between an internal face, placed facing each emitting element, and a first face, the first face of the basic cover lying parallel to the radial plane;

in step ii), obtaining an auxiliary cover such that the external face of the auxiliary cover comprises a plurality of centers of the external face;

in step iii), forming, in the external face of the auxiliary cover, a plurality of peripheral portions, about a plurality of central portions, respectively, each central portion passing through one center of the external face, and being parallel to the second face, each peripheral portion being inclined with respect to the central portion to which it is adjacent, such that, in each peripheral portion, the thickness of the auxiliary cover decreases as a function of a distance from the central portion to which the peripheral portion is adjacent; and in step iv), assembling the auxiliary cover with the basic cover, the first face being assembled against the second face, the assembly being carried out in such a way that at least one center of the external face is aligned with the center of one emitting element, parallel to a transverse axis perpendicular to the radial plane.

The present disclosure will be better understood on reading the description of the examples of embodiment that are presented, in the rest of the description, with reference to the figures listed below.

BRIEF DESCRIPTION OF THE DRAWINGS

In FIGS. 3D and 3E, the light source is a light source according to the prior art and according to the first embodiment, respectively.

DETAILED DESCRIPTION

Figure 1A:
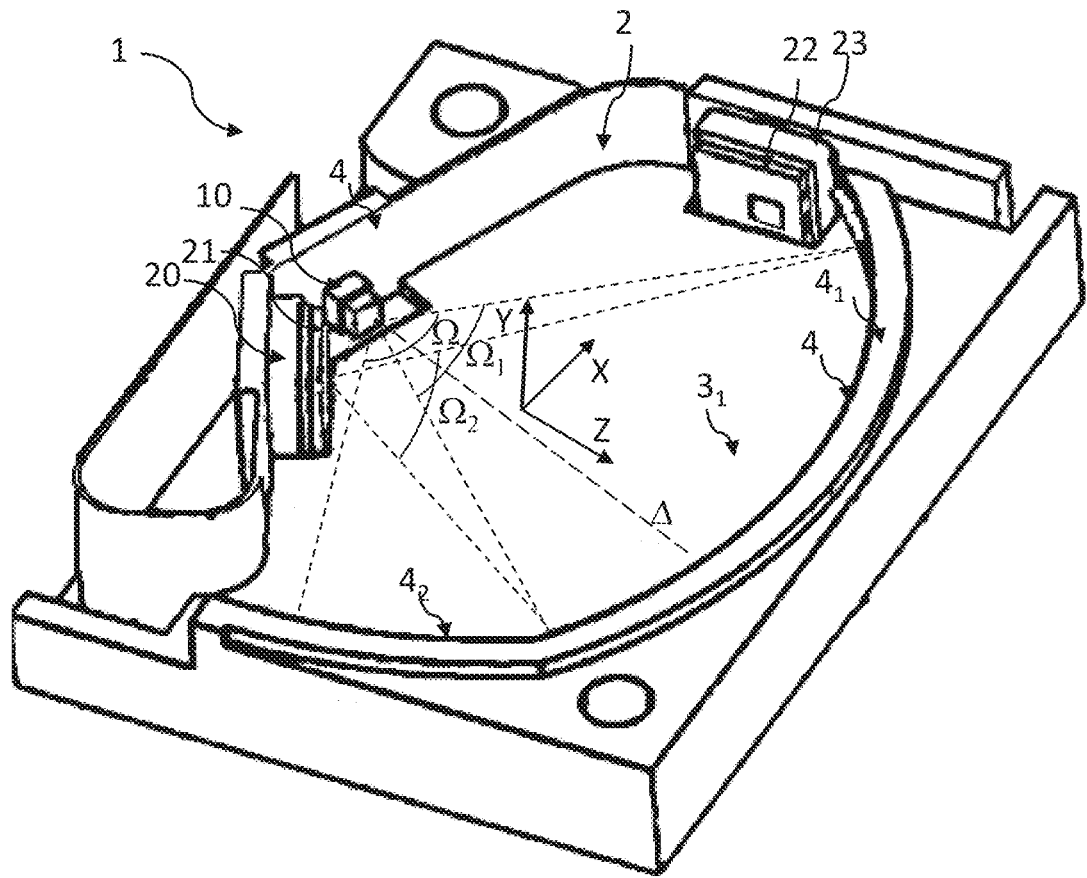
FIG. 1A shows one example of a gas sensor able to comprise a light source according to the first subject of the present disclosure.
Figure 1B:
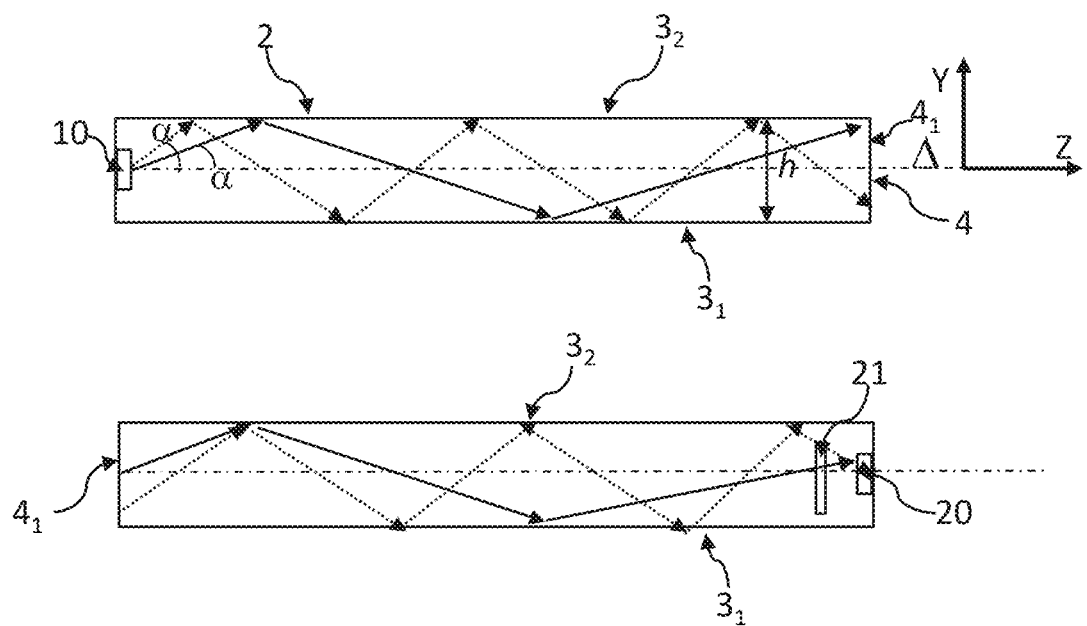
FIG. 1B shows propagation of light, from a light source, between two parallel reflective walls.

FIG. 1A shows one example of an NDIR gas sensor 1, this sensor being described in WO2018162848. The sensor comprises an enclosure 2, capable of receiving a gas to be analyzed. The enclosure is bounded by two walls $3_1$, $3_2$, which are referred to as transverse walls, and which lie in a transverse plane XZ. In FIG. 1A, a first transverse wall $3_1$ has been shown, the second transverse wall $3_2$ having been drawn see-through so as to allow the interior of the enclosure 2 to be seen. The transverse walls $3_1$ and $3_2$ are shown in FIG. 1B.

The transverse walls may be parallel to the transverse plane $P_{XZ}$, or substantially parallel to the latter, the term "substantially" indicating that an angular tolerance, for example +/−20° or +/−30° is acceptable. They may be planar or curved.

The gas sensor 1 also comprises a peripheral wall 4, delimiting the enclosure 2, and extending between the first transverse wall $3_1$ and the second transverse wall $3_2$. The peripheral wall 4 extends about a longitudinal axis Y, perpendicular to the transverse plane $P_{XZ}$. The peripheral wall 4 takes the form of a cylindrical wall, the cross section of which, in the plane $P_{XY}$, comprises curved portions $4_1$, $4_2$ and planar portions. The curved portions may notably be elliptical. An elliptical portion follows, in the transverse plane $P_{XZ}$, the outline of one portion of an ellipse.

The gas sensor 1 comprises a light source 10, capable of emitting a light wave in an emission cone $\Omega$, the emission cone extending about an emission axis $\Delta$. The light source 10 is configured to emit the light wave in an illumination spectral band $\Delta\lambda$. The illumination spectral band $\Delta\lambda$ lies in the infrared, for example between 1 μm and 10 μm.

The first curved portion $4_1$ is reflective. It is configured to receive a first portion $\Omega_1$ of the emission cone $\Omega$, so as to reflect it toward a measuring photodetector 20. The light wave thus passes through the gas present in the enclosure 2, before being detected by the measuring photodetector 20. In the example in question, the measuring photodetector 20 is a thermopile, able to deliver a signal depending on the intensity of the light wave to which the photodetector is exposed. It may also be a question of a photodiode or of another type of photodetector. The measuring photodetector 20 may be coupled to a band-pass filter 21, the spectral band of which corresponds to a spectral band of a gaseous species $G_s$, an amount $C_s$ of which in the gas mixture it is desired to determine. The intensity I of the light wave detected by the measuring photodetector 20 depends on the amount $C_s$ according to the Beer-Lambert relation:

$$att = \frac{I}{I_0} = e^{-\mu(C_s)l} \quad (1)$$

where:
- $\mu(C_s)$ is an attenuation coefficient, which is dependent on the sought amount $C_s$;
- l is the thickness of gas passed through by the light wave in the enclosure; and
- $I_0$ is the intensity of the incident light wave, which corresponds to the intensity of the wave that would reach the measuring photodetector 20 in the absence of absorbent gas in the enclosure.

The ratio $I/I_0$ between I and $I_0$ corresponds to an attenuation att generated by the gas species in question.

During each pulse of the light source 10, it is thus possible to determine $\mu(C_s)$, this allowing $\hat{C}_s$ to be estimated given that the relationship between $C_s$ and $\mu(C_s)$ is known.

Expression (1) assumes the intensity $I_0$ of the light wave emitted by the light source 10 is known. To this end, the device may comprise a reference photodetector 23, arranged such that it detects a light wave, called the reference light wave, that reaches the reference photodetector 23 without interacting with the gas present in the enclosure 2, or without interacting with it significantly. The peripheral wall 4 comprises, to this end, the second reflecting portion $4_2$, which is configured to receive a second portion of the emission cone $\Omega$ emitted by the light source 10, so as to reflect it toward the reference photodetector 23. The intensity of the reference light wave, detected by the reference photodetector 23, is designated by the reference intensity $I_{ref}$. In this example, the reference photodetector 23 is associated with an optical filter, called the reference optical filter 22. The reference optical filter 22 defines a passband corresponding to a range of wavelengths not absorbed by the sample. The reference passband is, for example, centered on the wavelength 3.91 μm. Measurement of $I_{ref}$ allows the value of $I_0$ to be corrected, this making it possible to determine $\mu(C_s)$, then to estimate $\hat{C}_s$. Measurement of $I_{ref}$ notably allows variations as a function of time in the intensity $I_0$ of the light wave emitted by the light source 10 to be taken into account.

FIG. 1B shows a cross section of the enclosure 2, along the axis of emission $\Delta$, between the light source 10 and the first elliptical portion $4_1$ of the peripheral wall 4. The cross section is shown in a transverse plane YZ. In the transverse plane YZ, the radiation is emitted by the light source in an angular range containing emission angles $\alpha$ distributed within ±90° on either side of the emission axis $\Delta$. The transverse walls $3_1$ and $3_2$ are reflective. Thus, depending on the emission angle $\alpha$, the radiation may undergo many reflections from the transverse walls before reaching the reflective elliptical portion $4_1$. Downstream of the latter, the radiation propagates to the measuring photodetector 20 while also undergoing reflections from the transverse walls.

By reflective wall, what is meant is a wall the reflection coefficient of which, in all or some of the spectral band $\Delta\lambda$ of the light wave emitted by the light source 10, is higher than 50%, and preferably higher than 80%. A reflective wall may be formed using a reflective material such as a metal, gold for example.

It will be understood that the larger the emission angle $\alpha$, the higher the number of reflections by the reflective walls $3_1$ and $3_2$. However, the higher the number of reflections, the more the intensity of the emitted radiation decreases, due to losses on each reflection. Furthermore, the measuring photodetector 20 is generally coupled to a band-pass filter 21. The band-pass filter defines a spectral band corresponding to the absorption spectral band of the sought gas species. It is preferable for the angle of the radiation incident on the band-pass filter 21 to be as close as possible to a normal to the filter. In other words, it is preferable for the angle of incidence of the radiation, with respect to the transverse axis Z, to be as small as possible. When the angle of incidence with respect to the filter is large, the passband defined by the filter may be modified, thus degrading filter performance. Lastly, the variability of the emission angles $\alpha$ with respect to the transverse axis Z, in the plane $P_{YZ}$, leads to variability in the optical paths of the various rays propagating between the light source 10 and the measuring photodetector 20. Specifically, the larger the emission angle $\alpha$, the higher the number of reflections on the optical path between the light source 10 and the measuring photodetector 20. Rays for which the emission angle $\alpha$ is large are therefore attenuated more than rays emitted at a smaller angle.

The observations described in the preceding paragraph are also valid for radiation propagating from the light source to the second elliptical portion $4_2$, then from the latter to the reference photodetector 23.

In light of the consequences described in the preceding paragraph, it is preferable to decrease, as much as possible, emission angles α with respect to the emission axis Δ of the light source (which corresponds to the transverse axis Z), while maintaining the level of intensity of the light source 10. This is an important aspect of embodiments of the present disclosure.

The light source 10 may notably be pulsed, the incident light wave being a pulse of duration generally comprised between 100 ms and 1 s. It may notably be a question of a light source comprising a membrane emitting element 11 traversed by a filament, a pulsed electric current being made to flow through the latter. The filament is a conductive track 11' heated to a temperature comprised between 400° C. and 800° C. so as to emit infrared light.

Figure 2A:
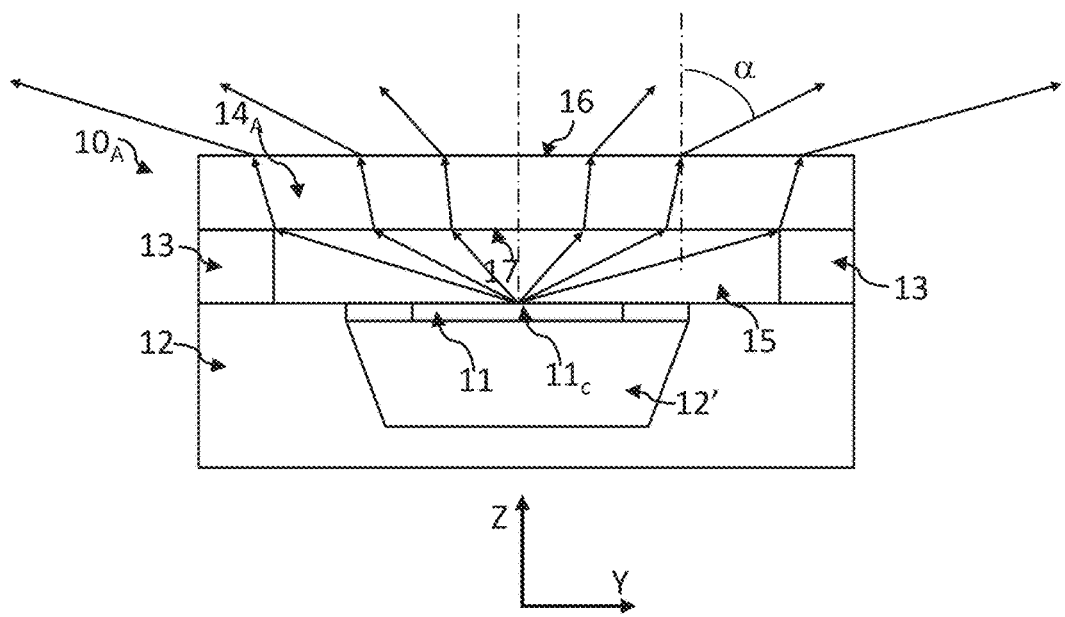
FIG. 2A schematically shows an infrared light source according to the prior art.

One example of a prior-art light source 10A, or basic light source, is shown in FIG. 2A. The light source comprises an emitting element 11 taking the form of a membrane linked to a substrate 12 and suspended over an aperture 12' formed in the latter. The membrane 11 lies in a cavity 15, placed under vacuum. The cavity 15 is bounded by an annular wall 13 and is closed by a cover $14_A$. The emitting element 11, in this example the membrane, extends as a radial plane $P_{XY}$, perpendicular to a transverse axis Z. The annular wall 13 links the cover 14A to substrate 12. The cover 14A extends between an internal face 17, adjacent to the cavity 15, and an external face 16. The internal face 17 and the external face 16 are parallel to the membrane 11, i.e., parallel to the radial plane $P_{XY}$.

Figure 2B:
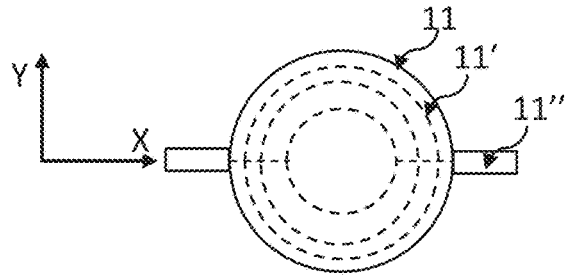
FIG. 2B schematically shows a light-emitting element taking the form of a membrane traversed by a conductive track.

FIG. 2B shows a disk-shaped membrane 11 traversed by a conductive track 11'. The membrane 11 extends as the radial plane $P_{XY}$. The membrane 11 is attached, by arms 11", to the substrate 12. When an electric current flows through the conductive track 11', it heats up and heats the membrane 11. The heating of the membrane 11 may be considered to be uniform. Under the effect of the heating, the membrane 11 emits infrared radiation in all directions (i.e., in a solid angle of 4π steradians). The spectrum of the infrared radiation, i.e., its intensity as a function of wavelength, is usually considered to be the emission spectrum of a gray body.

In FIG. 2A tracings of rays emitted from the center $11_c$ of the membrane 11 and propagating through the cavity 15 have been represented by arrows. In fact, rays are emitted from the entire surface of the membrane. The emission angle α with respect to the transverse axis Z has also been shown. The cover of the light source is made of a material the refractive index of which is higher than that of air in the emission spectral band of the membrane 11. It is, for example, a question of silicon. Due to the variation in refractive index between the vacuum and the silicon on the one hand, and between the silicon and the outside air on the other hand, the angle α decreases at the interface between the vacuum and the silicon, then increases at the interface between the silicon and the outside air.

Embodiments of the present disclosure relate to optimizing the light source, so as to increase the amount of radiation that emerges, from the cover 14, with an emission angle α, with respect to the transverse axis Z, smaller than ±30° or smaller than ±10°.

Figure 2C:
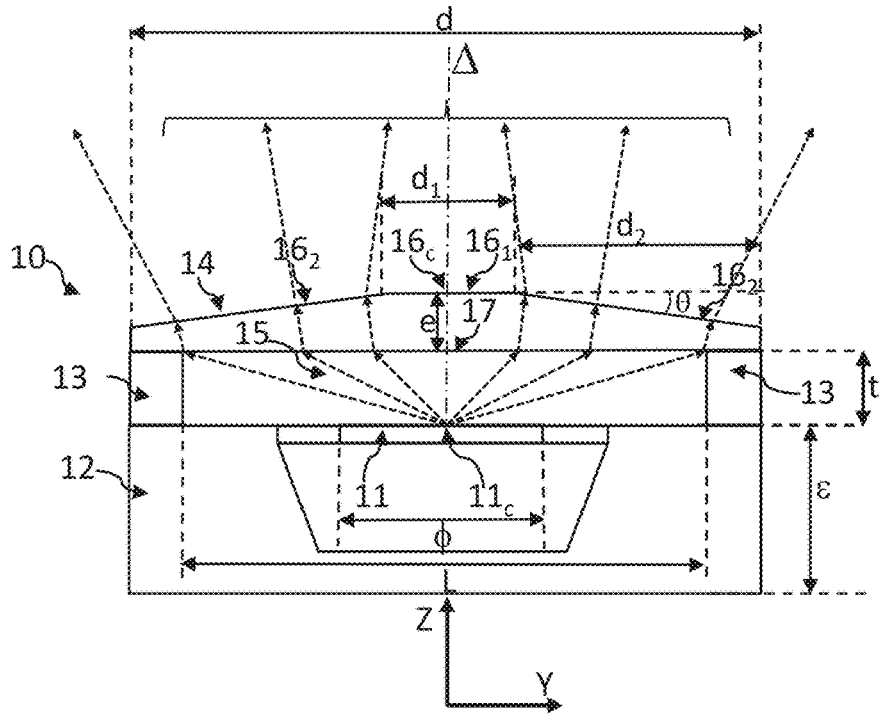
FIG. 2C shows a first embodiment of a light source according to embodiments of the present disclosure.

A first embodiment is shown in FIG. 2C. In this figure, the light source 10 comprises the same elements as those described in relation to the prior-art light source 10A, with the exception of the cover 14, the latter being modified as described below. The membrane 11 extends about a center $11_c$. The external face 16 extends about a center $16_c$. Along the transverse axis Z, the center $16_c$ of the external face is aligned with the center $11_c$ of the membrane 11. The distance between the internal face 17 and the external face 16, along the transverse axis Z, corresponds to a thickness e of the cover 14.

The external face 16 comprises a central portion $16_1$, which comprises the center $16_c$ of the external face and which extends, about the center, a length $d_1$ parallel to the longitudinal axis Y. The central portion $16_1$ lies parallel to the radial plane $P_{XY}$, i.e., parallel to the membrane 11. Generally, the external face 16 comprises at least one peripheral portion $16_2$, adjacent to the central portion $16_1$. The peripheral portion $16_2$ is inclined at an angle of inclination θ, with respect to the central portion $16_1$. The inclination is such that the thickness e of the cover 14 decreases with distance from the central portion $16_1$ (or from the center $16c$ of the external face) along the longitudinal axis Y.

In the example shown, the dimensions L, Φ, ε, e, t, d shown in FIG. 2C are: L=800 μm; Φ=300 μm; e=675 μm; t=120 μm; e=280 μm; d=1140 μm.

In the embodiment shown in FIG. 2C, the light source comprises one peripheral portion $16_2$ inclined at the angle θ on either side of the central portion $16_1$, along the longitudinal axis Y. Each peripheral portion $16_2$ extends, from the central portion $16_1$, a length $d_2$ defined parallel to the longitudinal axis Y. The length $d_2$ and the angle of inclination θ may be optimized as described with reference to FIG. 4D.

The inclination of the peripheral portion $16_2$ of the external face 16 has the effect of inclining the normal to the silicon/air interface defined by the external face 16. If α is the angle with which a ray emerges from the external face 16 with respect to the transverse axis Z, the inclination of the peripheral portion $16_2$ of the external face 16 allows the angle α to be decreased compared to the prior-art configuration in which the external face 16 is not inclined. This effect is illustrated in FIGS. 2D and 2E.

Figure 2D:
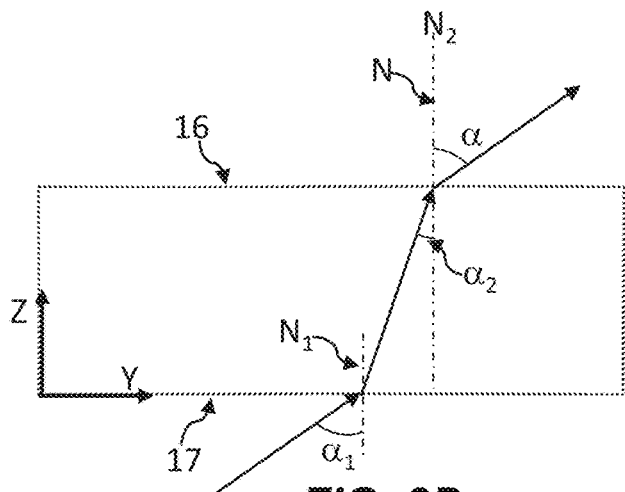
FIGS. 2D and 2E illustrate propagation of a light ray from one side to the other of the external face of the cover of the light source, considering a light source according to the prior art and a light source according to embodiments of the present disclosure, respectively.
Figure 2E:
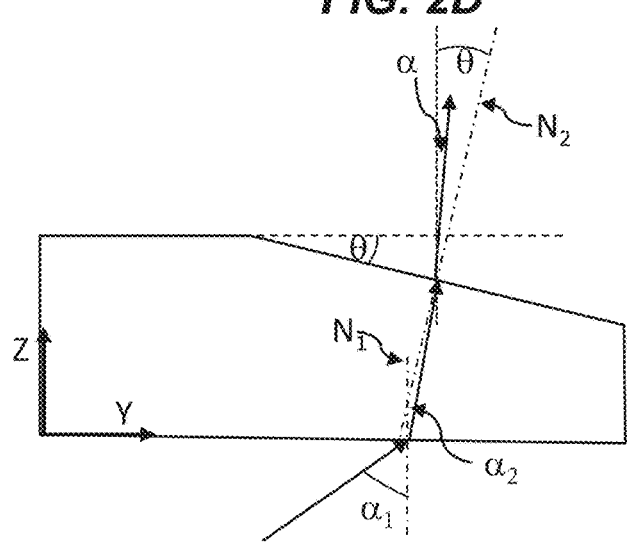

FIG. 2D illustrates a prior-art configuration. A ray has been shown propagating through the cover 14. The angles $α_1$, $α_2$ and α are, respectively:

the angle of incidence of the ray with respect to the normal $N_1$ to the internal face 17;
the angle of incidence of the ray with respect to the normal $N_2$ to the external face 16;
the angle of the ray emerging from the external face 16 with respect to the transverse axis Z.

In this example, the transverse axis Z is parallel to the normal $N_2$. The cover 14 is made of silicon, the optical refractive index of which is comprised between 3.4 and 3.5. The cavity 15 is under vacuum, the refractive index of vacuum being 1. Beyond the external face 16, the ray propagates through the gas to be analyzed, the latter being comparable to air, with a refractive index equal to 1: therefore $α=α_1$. Due to the change in refractive index on either side of the interface, the angle $α_2$, in the cover 14, is smaller than the angles α and $α_1$.

FIG. 2E illustrates a configuration such as shown in FIG. 2C. As in FIG. 2D, a ray has been shown propagating through the cover 14. The angles $α_1$, $α_2$ and α correspond to the definitions given with reference to FIG. 2D. In FIG. 2E, the ray emerges from the peripheral portion $16_2$ of the external face. The peripheral portion $16_2$ is inclined, with respect to a plane parallel to the radial plane $P_{XY}$ and passing through the center $16_c$ of the external face 16, by an angle of inclination θ. Therefore, the normal $N_2$ to the cover 14/air interface is also inclined by an angle θ with respect to the transverse axis Z. The angle α, with respect to the transverse axis Z, is smaller than that of the prior-art configuration.

Comparison of FIGS. 2D and 2E shows that the inclination of the external face 16 results in a decrease in the angle α compared to the prior art. Thus, the inclination of the peripheral portion $16_2$ of the external face 16 leads to a decrease in the angles with which the rays emerge from the peripheral portion $16_2$, compared to the prior-art configuration, in which the external face 16 is planar.

Figure 2F:
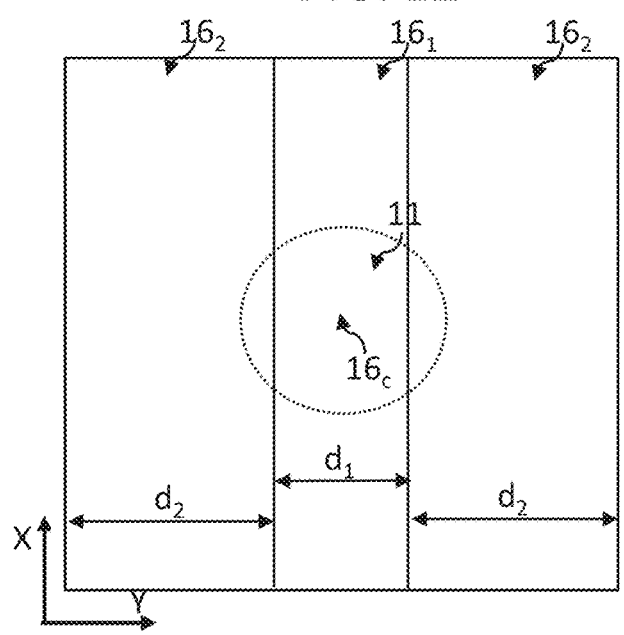
FIG. 2F is a top view of a light source according to the first embodiment.
Figure 2G:
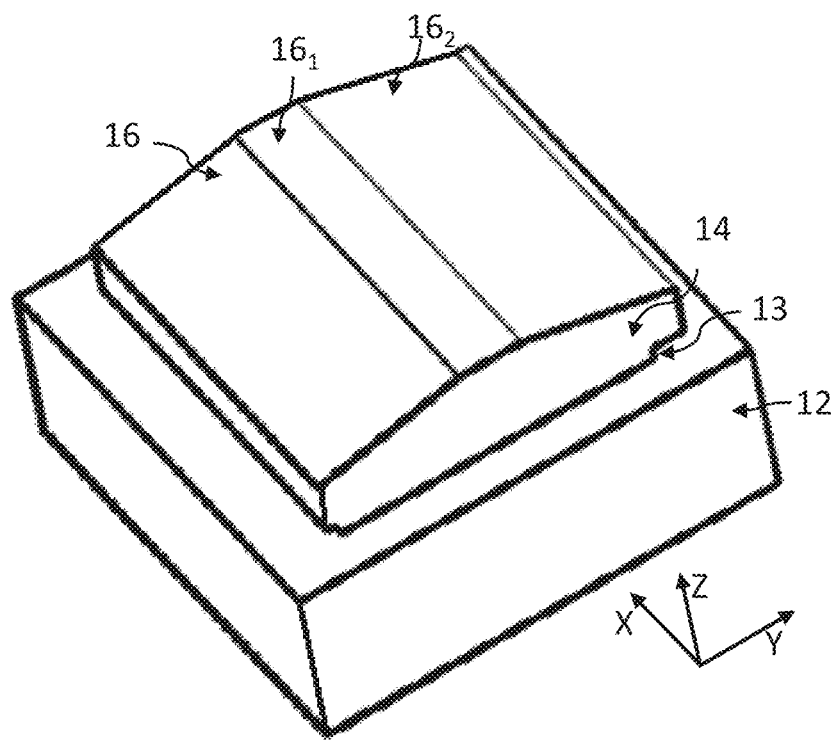
FIG. 2G is a perspective view of a light source according to the first embodiment.
Figure 2H:
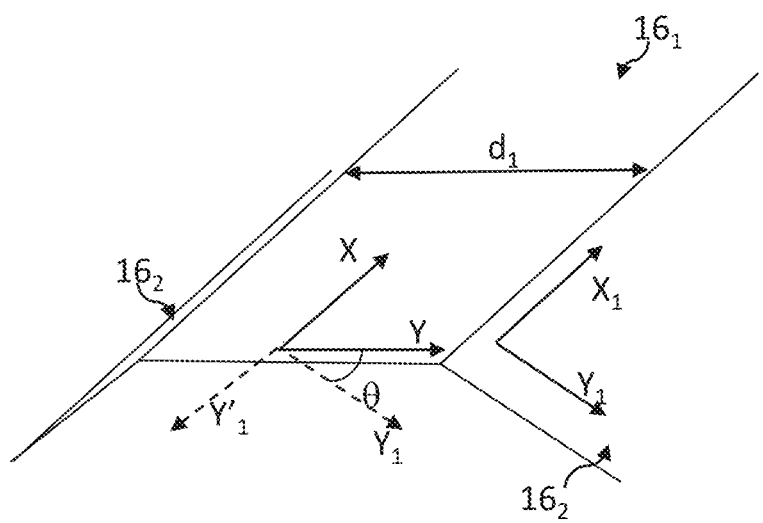
FIG. 2H is a detail of the external face of a light source according to the first embodiment.

FIG. 2F illustrates a top view, i.e., a view of a plane parallel to the radial plane $P_{XY}$, of the light source shown in FIG. 2C. The membrane 11 has been shown in dotted lines. FIG. 2G is a perspective view of the light source shown in FIG. 2C. FIG. 2H shows the central portion $16_1$ of the external face, which is planar, and lies parallel to the radial plane $P_{XY}$. A peripheral portion $16_2$ has also been shown. The radial plane is defined by a lateral axis X orthogonal to a longitudinal axis Y. The peripheral portion $16_2$ lies parallel to a plane defined by a first lateral axis $X_1$ orthogonal to a first longitudinal axis $Y_1$ (or $Y_1'$). In the embodiment shown:
  the first lateral axis $X_1$ is parallel to the lateral axis X;
  the first longitudinal axis $Y_1$ (or $Y'_1$) is inclined with respect to the lateral axis Y, in a transverse plane $P_{YZ}$. The acute angle of inclination θ between the axes $Y_1$ (or $Y'_1$) and Y corresponds to the angle of inclination of the peripheral portion $16_2$ with respect to the central portion $16_1$.

Various configurations corresponding to the embodiment illustrated in FIG. 2C have been modeled, by ray tracing. The angle of inclination θ and the length $d_2$ of the peripheral portion $16_2$ were varied. The objective was to maximize a number of rays that emerge from the external face 16 and propagate with an angle α smaller than ±30° with respect to the transverse axis Z.

Figure 3A:
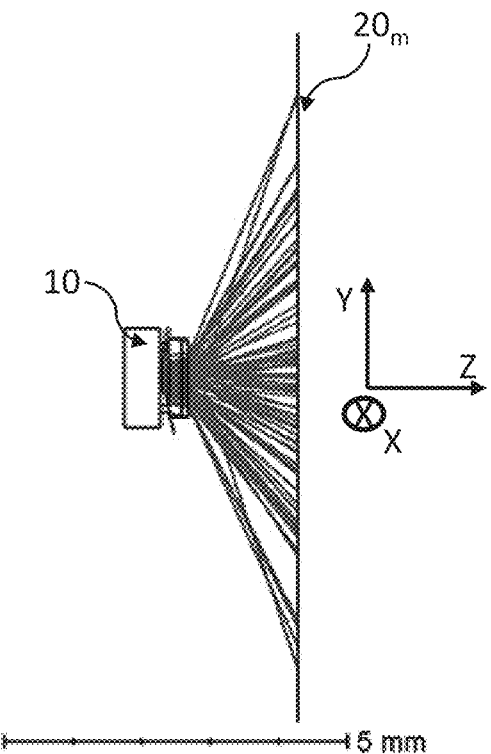
FIG. 3A shows a configuration used to model the rays emerging from the light source.

FIG. 3A shows a configuration employed to perform the modeling. The light source 10 was placed facing a modeled photodetector $20_m$ extending infinitely about the transverse axis Z of the light source 10. The light source is assumed to emit radiation in a solid angle of 2π steradians in a half-space bounded by the light source 10 and comprising the photodetector $20_m$. The model was defined so that the angle α of each ray emitted by the source was the opposite of the angle received by the modeled photodetector $20_m$.

Figure 3B:
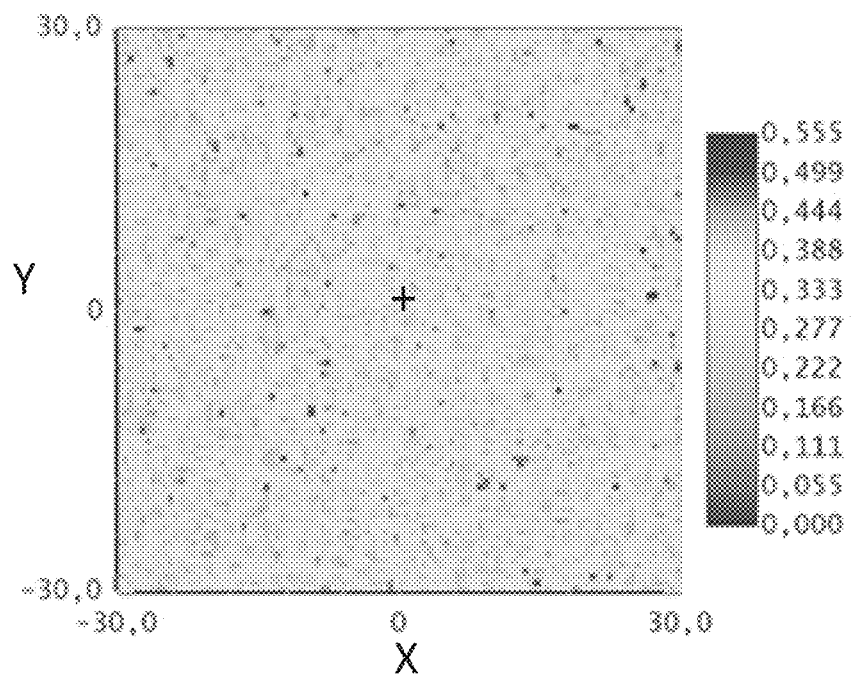
FIGS. 3B and 3C are histograms of angles of rays detected by a modeled photodetector. These histograms were obtained following modeling of a light source according to the prior art and according to the first embodiment of the present disclosure, respectively.
Figure 3C:
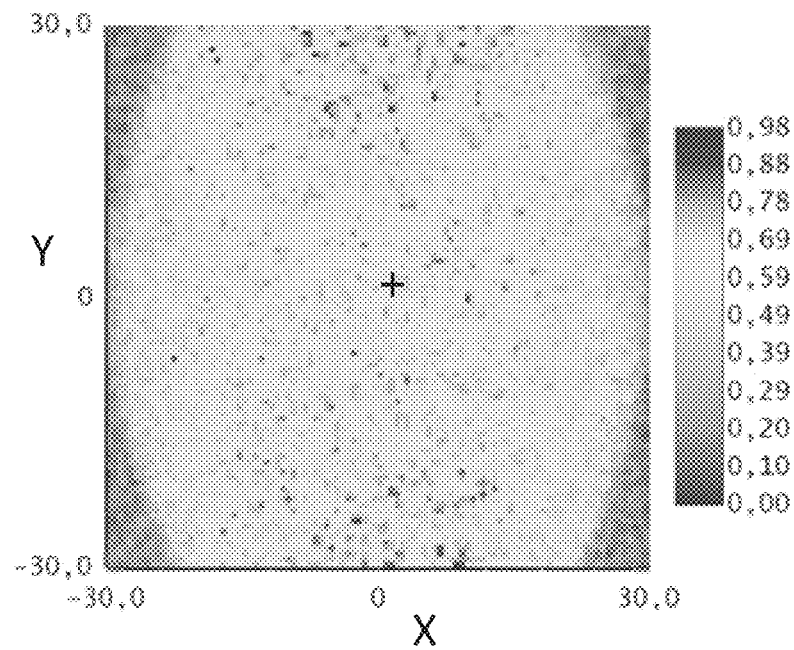

FIGS. 3B and 3C are histograms of the angles α, with respect to the transverse axis Z, of the rays detected by the photodetector $20_m$, considering respectively:
  a prior-art light source, such as described with reference to FIG. 2A;
  a light source according to the configuration shown in FIG. 2C.

In FIGS. 3B and 3C, the x-axis and y-axis represent the angles, with respect to the axis Z, of the rays detected by the photodetector $20_m$ in the transverse planes $P_{XZ}$ and $P_{YZ}$, respectively. The center of each figure, which is marked by a cross, corresponds to rays parallel to the axis Z. In each figure, the grayscale level represents a number of detected rays. In FIG. 3B, the histogram is relatively uniform. The angular distribution of the detected photons is considered to be uniform. In FIG. 3C, the histogram is observed to coalesce about small angles in the transverse plane $P_{YZ}$. This shows that embodiments of the present disclosure make it possible to increase the proportion of the rays emitted by the light source 10 that emerge from the cover in an angular range of ±30°, or even ±25° with respect to the transverse axis Z.

Modeling was carried out in which the parameters $d_2$ (length of each peripheral portion parallel to the longitudinal axis Y), and θ (angle of inclination of each peripheral portion) were varied. The optimal parameters were $d_2$=494 μm and θ=11°. With these optimal parameters, 54.6% of the rays emitted by the light source 10, in the half-space comprising the photodetector, emerge from the cover 14 at angles α, with respect to the transverse axis Z, comprised in the angular range ±30°. With a prior-art light source, such as described with reference to FIG. 2A, this proportion is 31%.

Figure 3D:
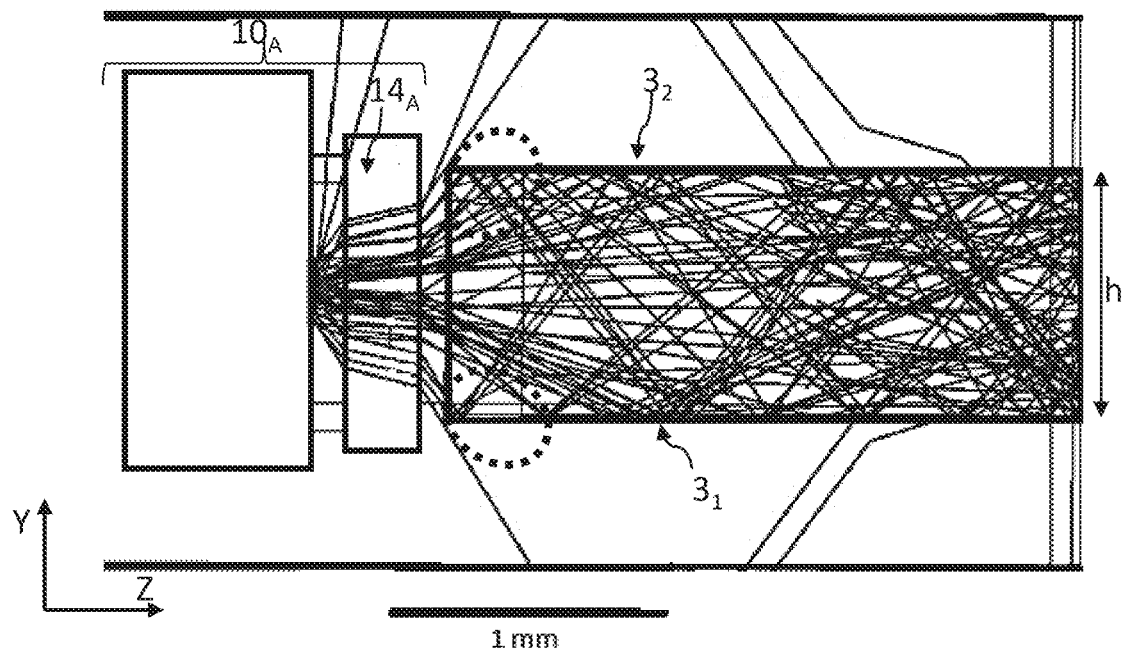
FIGS. 3D and 3E show ray tracings generated by placing a light source between two planar reflective walls lying parallel to each other.
Figure 3E:
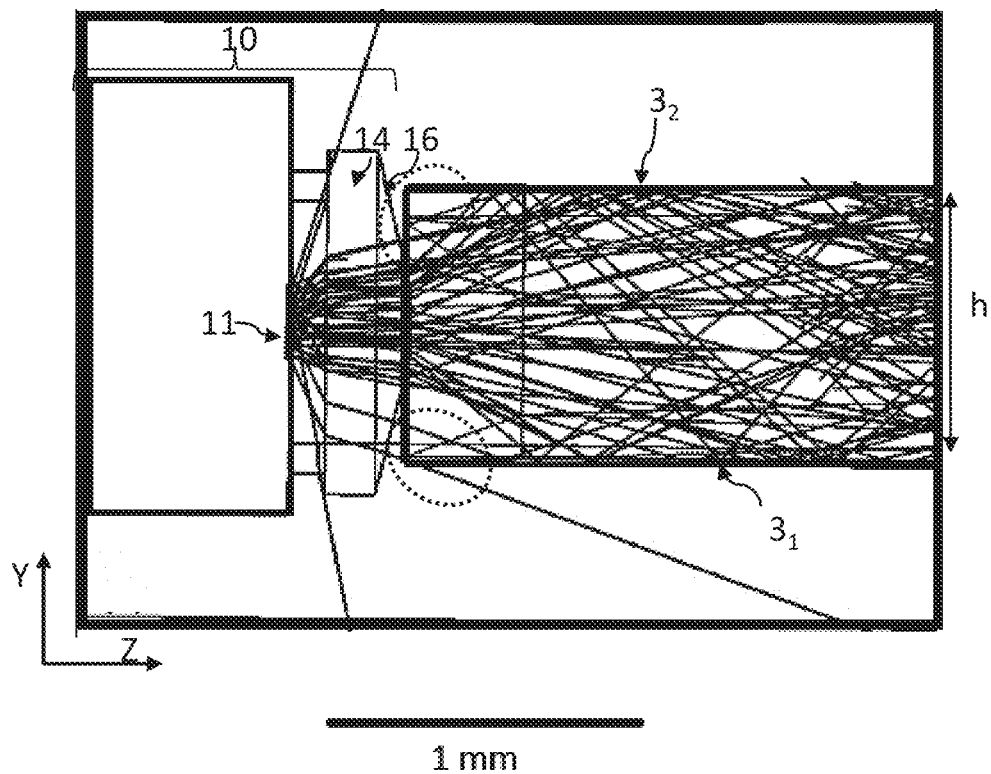

FIGS. 3D and 3E show ray tracings for a prior-art light source $10_A$ (cf. FIG. 2A), and a light source 10 in the configuration shown in FIG. 2C, respectively. In each of these figures, the light source is placed as shown in FIGS. 1A and 1B: It opens into enclosure 2 of the gas sensor. In this example, the light source is placed between two reflective walls $3_1$ and $3_2$ that are spaced from each other by a distance h=1.2 mm. The transverse axis Z of the light source 10 is parallel to the transverse walls, and centered with respect to the latter. Comparison of FIGS. 3D and 3E shows that embodiments of the present disclosure allow the number of rays emerging from the light source 10 with an angle α of ±30° with respect to the transverse axis Z to be increased. In FIGS. 3D and 3E, zones corresponding to rays emitted at an angle α larger than 30° have been circled. The configuration according to embodiments of the present disclosure (FIG. 3E) allows the proportion of rays passing through these zones to be decreased.

Figure 4A:
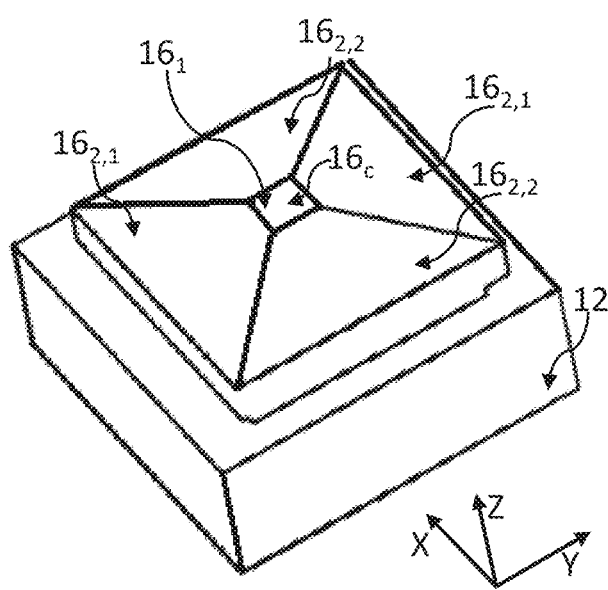
FIGS. 4A to 4C show a light source according to a second embodiment.
Figure 4B:
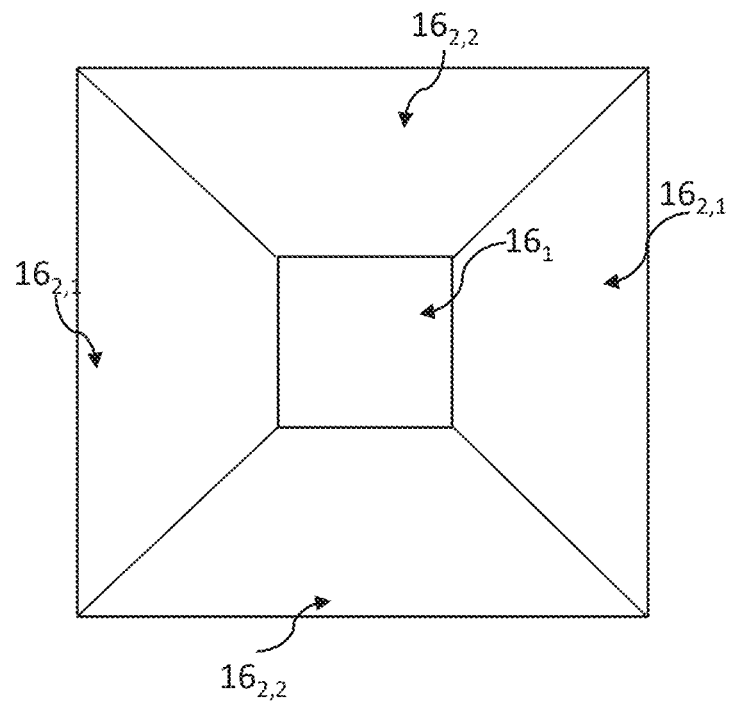
Figure 4C:
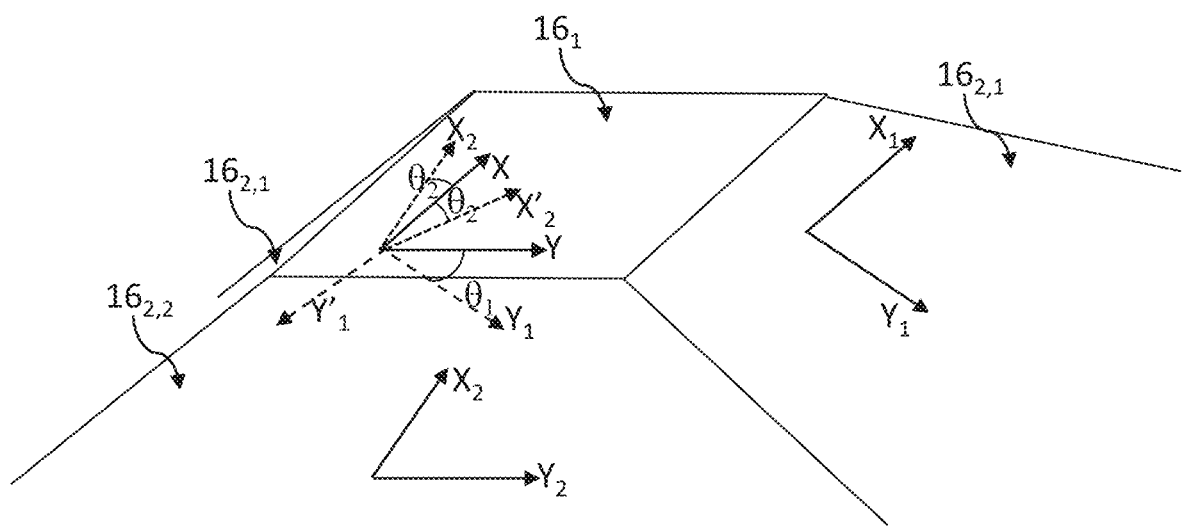

FIGS. 4A to 4C show a second embodiment of the present disclosure. According to this embodiment, the external face 16 of the light source 10 comprises a planar central portion $16_1$, extending as a plane parallel to the radial plane $P_{XY}$ and passing through the center $16_c$ of the external face 16. The central portion $16_1$ extends along a lateral axis X orthogonal to a longitudinal axis Y. The light source 10 also comprises:
  two peripheral portions, $16_{2,1}$, called first peripheral portions, extending, on either side of the central portion $16_1$, along the longitudinal axis Y. As described with reference to the embodiment shown in FIG. 2C, each peripheral portion extends along a first lateral axis $X_1$ orthogonal to a first longitudinal axis $Y_1$ (or $Y'_1$). The first lateral axis $X_1$ is parallel to the lateral axis X. The first longitudinal axis $Y_1$ (or $Y'_1$) makes a first acute angle of inclination $θ_1$ with respect to the longitudinal axis Y; and
  two second peripheral portions $16_{2,2}$, extending, on either side of the central portion $16_1$, along the lateral axis X. Each second peripheral portion extends along a second lateral axis $X_2$ (or $X'_2$) orthogonal to a second longitudinal axis $Y_2$. The second longitudinal axis $Y_2$ is parallel to the longitudinal axis Y. The second lateral axis $X_2$ makes a second acute angle of inclination $θ_2$ with respect to the lateral axis X.

The first angle of inclination $θ_1$ and the second angle of inclination θ2 may be the same angle of inclination θ.

FIG. 4A is a perspective view of the second embodiment. FIG. 4B is a top view of the second embodiment. FIG. 4C shows the lateral and longitudinal axes of the central portion and of each peripheral portion.

Such an embodiment may, for example, be suitable for a gas sensor such as described with reference to FIG. 1A, but also for a gas sensor in which the enclosure 2, separating the light source from the photodetector, is cylindrical, about the transverse axis Z.

Figure 4D:
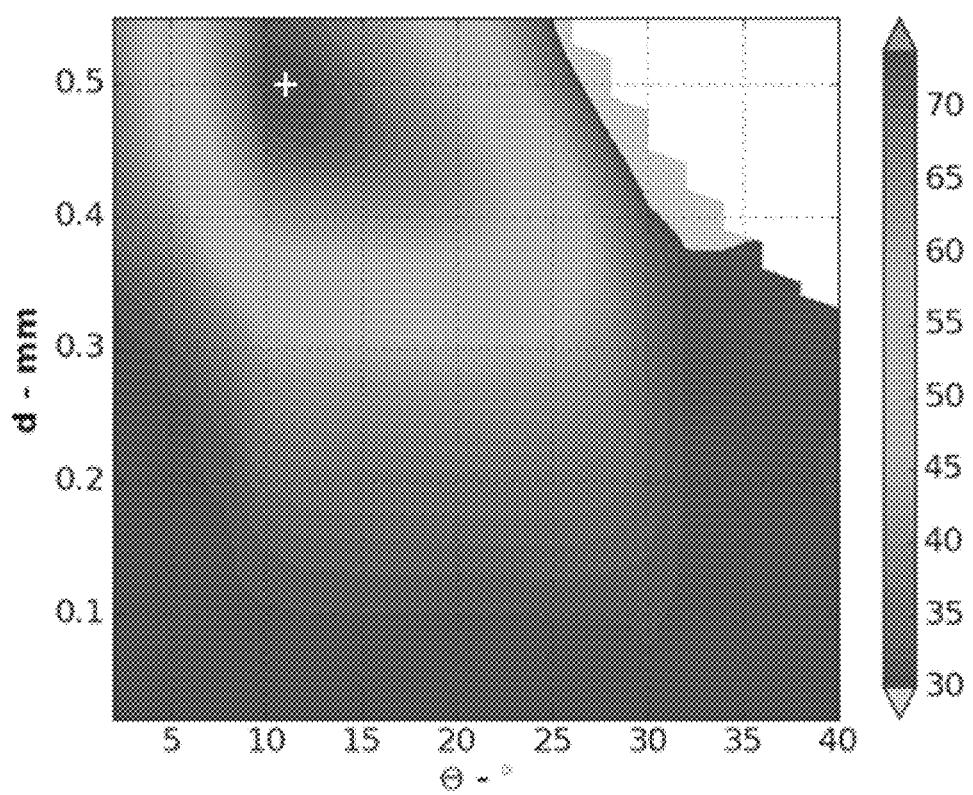
FIG. 4D illustrates the results of an optimization of geometric parameters of the external face, the objective being to increase a proportion of rays lying in an angular range of $\pm 30°$ about a transverse axis.

FIG. 4D shows the result of modeling that was carried out, and in which the parameters d2 (length of each peripheral portion parallel to the longitudinal axis Y or to the lateral axis X), and θ (angle of inclination of each peripheral portion) were varied. The y-axis corresponds to the range of variation in $d_2$ (unit: mm) and the x-axis corresponds to the range of variation in θ (unit: degrees). The grayscale level corresponds to a percentage of rays emerging from the cover 14 in an angular range of ±30° about the transverse axis Z. The objective of the modeling was to determine the parameters that maximized this percentage. The optimal parameters correspond to the cross drawn in FIG. 4D: $d_2$=494 µm and $\theta$=11°. With these optimal parameters, 74.5% of the rays emitted by the light source 10, in the half-space comprising the photodetector, emerge from the cover 14 at angles $\alpha$, with respect to the transverse axis Z, comprised in the angular range ±30°. With a prior-art light source, such as described with reference to FIG. 2A, this proportion is 31%.

Figure 4E:
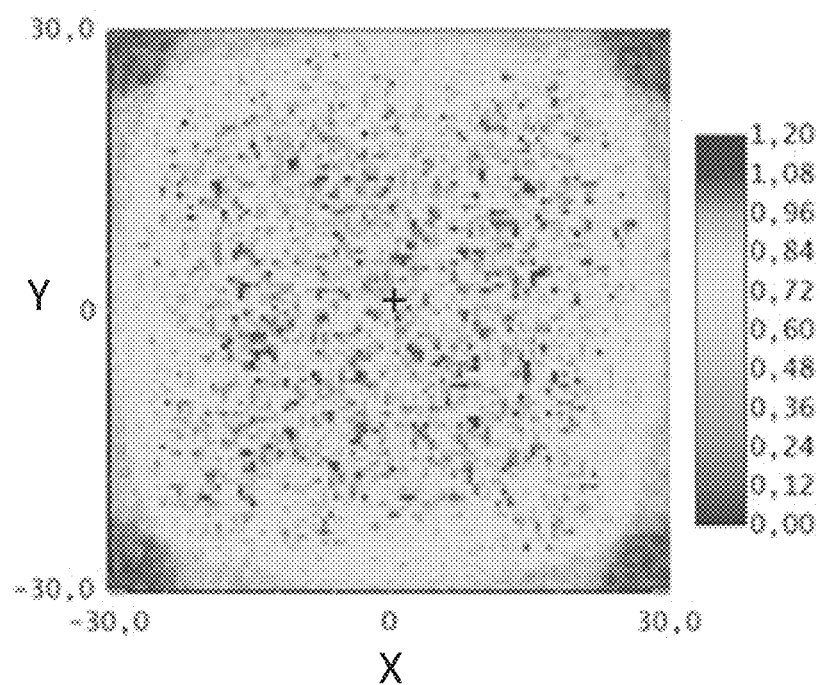
FIG. 4E shows a histogram of angles of rays detected by a modeled photodetector. This histogram was obtained following modeling of a light source according to the second embodiment of the present disclosure.

FIG. 4E is a histogram of the angles $\alpha$, with respect to the transverse axis Z, of the rays detected by the photodetector $20_m$. This histogram was produced in the same way as those of FIGS. 3B and 3C, for a light source such as shown in FIGS. 4A to 4C, with the optimized parameters reported in the preceding paragraph.

Figure 5A:
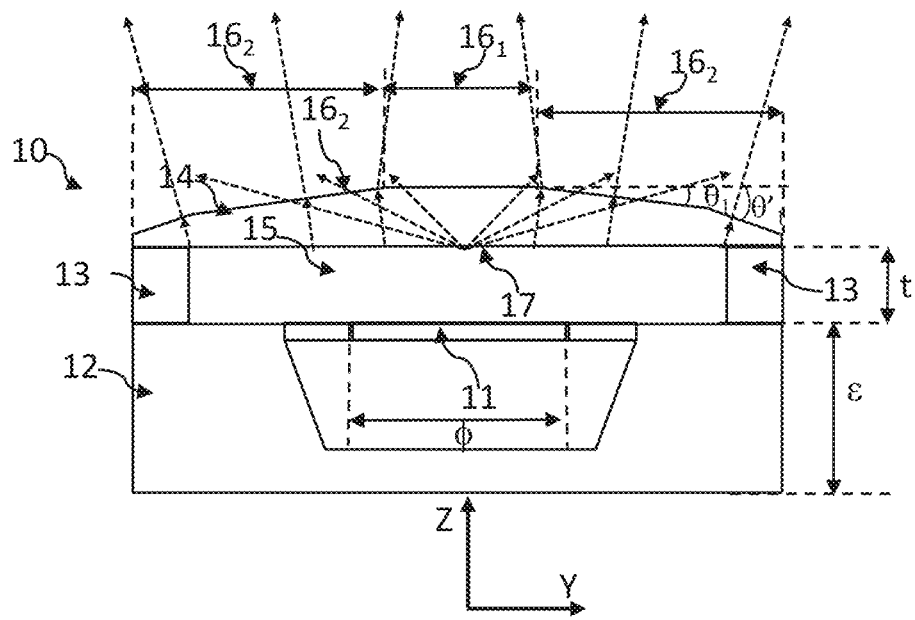
FIG. 5A shows a light source according to a third embodiment.

FIG. 5A shows a third embodiment. In this embodiment, the external face 16 of the light source 10 comprises a peripheral portion $16_2$ extending, on either side of the central portion, with a first angle of inclination $\theta_1$ over one portion of the length of the peripheral wall (peripheral portion $16_2$), then with a second angle of inclination $\theta_1'$ over another portion of the length of the peripheral wall (peripheral portion $16_2$), with $\theta_1'>\theta_1$. In this embodiment, the angles of inclination $\theta_1$, $\theta_1'$ correspond to the acute angles between the longitudinal axis Y and the first longitudinal axis $Y_1$ of each peripheral portion. This embodiment corresponds to an improvement of the first embodiment, each peripheral portion successively comprising two angles of inclination.

An optimization was carried out, as described with reference to FIG. 4D. It has been shown that, in such a configuration, taking the dimensions described with reference to FIG. 2C into account, the optimum angles $\theta_1$ and $\theta_1'$ are equal to 7.5° (over a length, parallel to the longitudinal axis Y, of 400 µm), and to 16° (over a length, parallel to the longitudinal axis Y, equal to 120 µm), respectively.

Figure 5B:
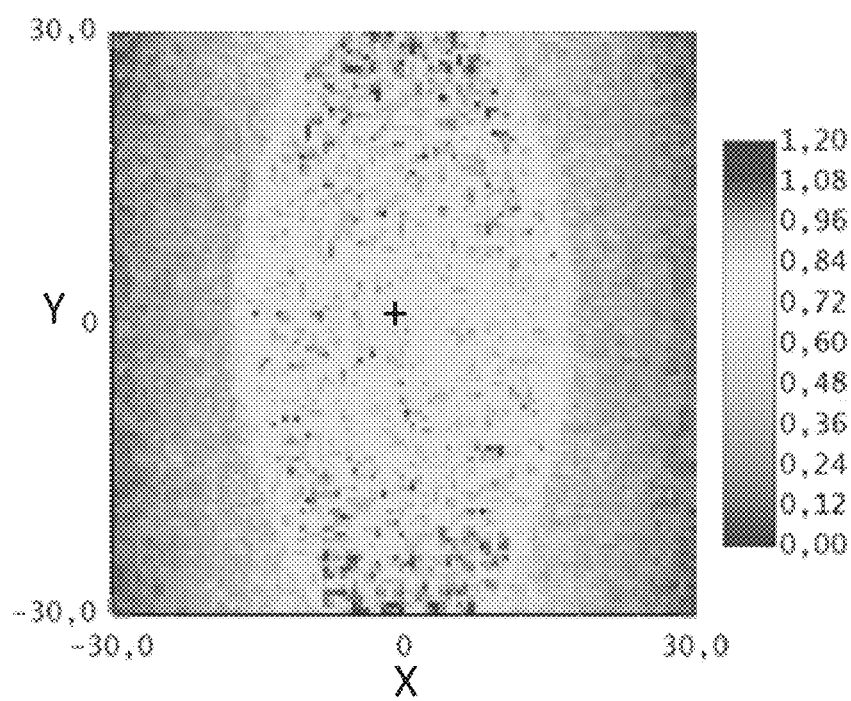
FIG. 5B shows a histogram of angles of rays detected by a modeled photodetector. This histogram was obtained following modeling of a light source according to the third embodiment of the present disclosure.

FIG. 5B is a histogram of the angles $\alpha$, with respect to the transverse axis Z, of the rays detected by the photodetector $20_m$. This histogram was produced in the same way as those of FIGS. 3B and 3C, for a light source such as shown in FIG. 5A, with the optimized parameters reported in the preceding paragraph.

In FIG. 5B, the x-axis and y-axis represent the angles, with respect to the axis Z, of the rays detected by the photodetector $20_m$ in the planes $P_{XZ}$ and $P_{YZ}$, respectively. The center of FIG. 5B, which is marked by a cross, corresponds to rays parallel to the axis Z. The grayscale level represents a number of detected rays. The histogram is observed to coalesce about small angles. This shows that embodiments of the present disclosure make it possible to increase the proportion of the rays emitted by the light source 10 that emerge from the cover 14 in an angular range of ±30°, or even ±20° with respect to the transverse axis Z.

Figure 5C:
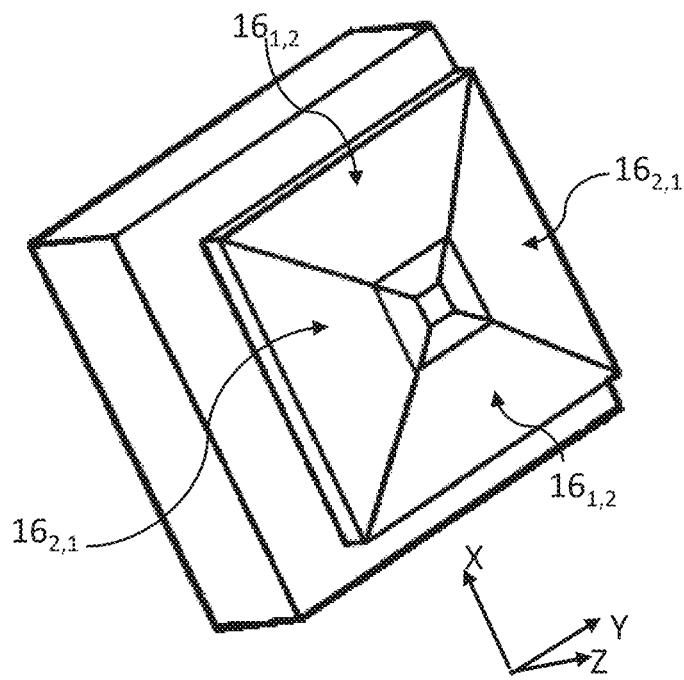
FIG. 5C shows a light source according to a fourth embodiment.

FIG. 5C shows a fourth embodiment in which the external face 16 comprises two first peripheral portions $16_{2,1}$ and two second peripheral portions $16_{2,2}$ such as described with reference to the second embodiment.

Each first peripheral portion $16_{2,1}$ extends along a first longitudinal axis $Y_1$ such as to make, with the longitudinal axis Y, a first acute angle of inclination $\theta_1$ over one portion of the length of the peripheral wall, then a second acute angle of inclination $\theta_1'$ over another portion of the length of the peripheral wall, with $\theta_1'>\theta_1$.

Each second peripheral portion $16_{2,2}$ extends along a second lateral axis $X_2$ such as to make, with the lateral axis X, the first acute angle of inclination $\theta_1$ over one portion of the length of the peripheral wall, then the second acute angle of inclination $\theta_1'$ over another portion of the length of the peripheral wall, with $\theta_1'>\theta_1$.

An optimization was carried out, as described with reference to FIG. 4D. It has been shown that, in such a configuration, taking the dimensions described with reference to FIG. 2C into account, the optimum angles $\theta_1$ and $\theta_1'$ are equal to 7.5° (over a length, parallel to the longitudinal axis Y, of 400 µm), and to 16° (over a length, parallel to the longitudinal axis Y, equal to 120 µm), respectively. With these optimal parameters, 76.7% of the rays detected by the photodetector $20_m$ emerge from the light source at angles, with respect to the transverse axis Z, comprised in the angular range ±30°. With a prior-art light source, such as described with reference to FIG. 2A, this proportion is 31%.

Figure 5D:
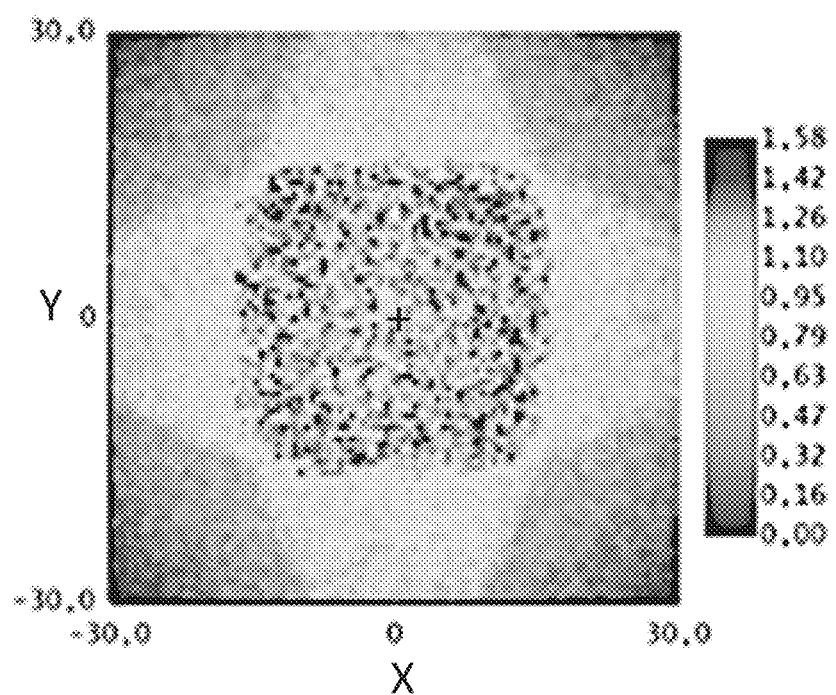
FIG. 5D shows a histogram of angles of rays detected by a modeled photodetector. This histogram was obtained following modeling of a light source according to the fourth embodiment of the present disclosure.

FIG. 5D is a histogram of the angles $\alpha$, with respect to the transverse axis Z, of the rays detected by the photodetector $20_m$. This histogram was produced in the same way as those of FIGS. 3B, 3C, 4E and 5B, for a light source such as shown in FIG. 5C, with the optimized parameters reported in the preceding paragraph.

In FIG. 5D, the x-axis and y-axis represent the angles, with respect to the axis Z, of the rays detected by the photodetector $20_m$ in the planes $P_{XZ}$ and $P_{YZ}$, respectively. The center of FIG. 5D, which is marked by a cross, corresponds to rays parallel to the axis Z. The grayscale level represents a number of detected rays. The histogram is observed to coalesce about small angles. This shows that embodiments of the present disclosure make it possible to increase the proportion of the rays emitted by the light source 10 that emerge from the cover 14 in an angular range of ±30°, or even ±20° with respect to the transverse axis Z.

Comparison of the histograms of FIGS. 5D, 5B, 4E and 3C, representing four embodiments of the present disclosure, with the histogram of FIG. 3B, shows the technical effect of embodiments of the present disclosure, namely an increase in the proportion of rays emerging from the light source 10 in an angular range of ±30°.

Figure 5E:
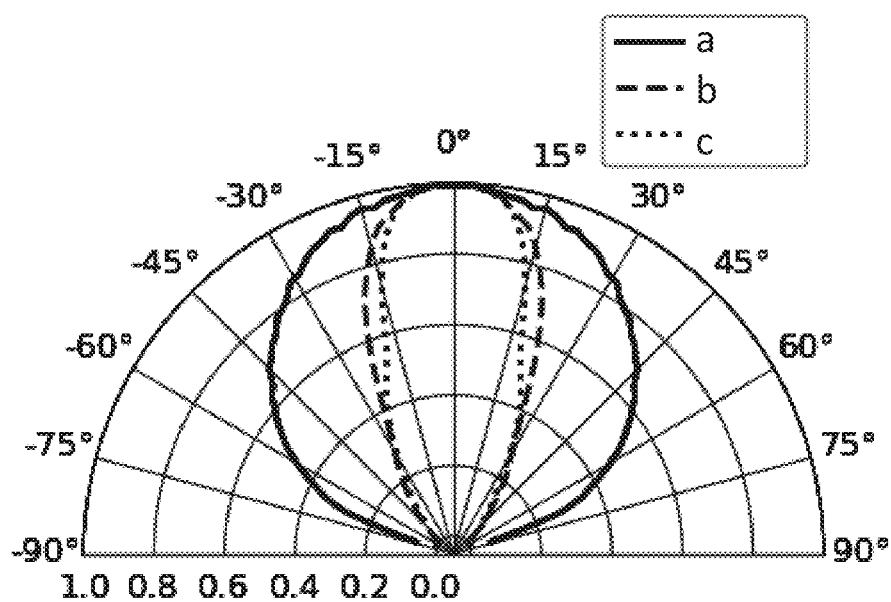
FIG. 5E shows a radiation pattern of light sources according to the prior art, the first embodiment and the third embodiment, respectively.

FIG. 5E shows respective emission patterns, in a transverse plane $P_{YZ}$ (or $P_{XZ}$ depending on the embodiment), of a light source:

in a prior-art configuration (described with reference to FIG. 2A): curve a;

in a configuration according to the first embodiment of the present disclosure (described with reference to FIGS. 2C to 2H) with optimized parameters ($\theta_1$=11°): curve b; and in a configuration according to the third embodiment of the present disclosure (described with reference to FIG. 5A) with optimized parameters ($\theta_1$=7.5°, $\theta_1'$=16°): curve c.

In FIG. 5E, the x-axis corresponds to a normalized light intensity. The angular range corresponds to the angle $\alpha$ between the rays emitted by the light source (i.e., emerging from the external face 16) and the transverse axis Z. Using each curve, the angular range $\Delta\theta_{0.5}$ for which the normalized luminous intensity was equal to 0.5 was estimated. The values of $\Delta\theta_{0.5}$ obtained from curves a, b and c are ±58°, ±24° and ±20°, respectively. This confirms the fact that embodiments of the present disclosure allow the light beam emitted by the emitting element 11 to be narrowed by decreasing the angular range with respect to the transverse axis Z. As may be seen by comparing FIGS. 3C and 5B, FIG. 5E confirms that the narrowing is more pronounced when the third embodiment is implemented, compared to the first embodiment.

Figure 6A:
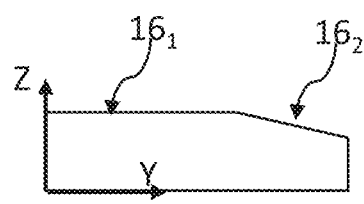
FIGS. 6A and 6B show one variant of the first embodiment.
Figure 6C:
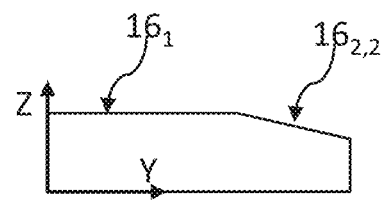
FIGS. 6C and 6D show one variant of the second embodiment.
Figure 6B:
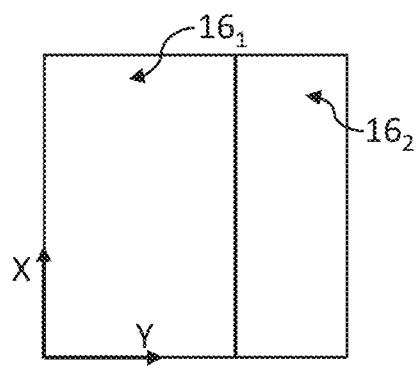
Figure 6D:
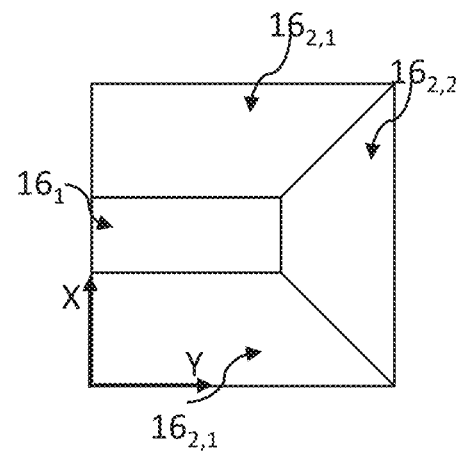

FIGS. 6A and 6B illustrate one variant of the first embodiment, in which the external face 16 comprises only a single peripheral portion $16_2$ extending about the central portion $16_1$. FIGS. 6C and 6D illustrate one variant of the second embodiment, in which the external face 16 comprises three peripheral portions: two portions $16_{2,1}$, and one portion referenced $16_{2,2}$.

Use of a light source according to the first and second embodiments has been modeled, employing parameters θ, $d_2$ optimized as described with reference to FIG. 4D, in a gas sensor such as shown in FIG. 1A. The light source 10 was placed such that the transverse axis Z corresponded to the central axis Δ shown in FIG. 1A. The amount of light detected by the measuring photodetector 20 and by the reference photodetector 23 was estimated. The transverse walls $3_1$ and $3_2$ were considered to be reflective, and separated from each other by a distance h=1.2 mm. The longitudinal axis Y of the light source 10 was orthogonal to the reflective walls $3_1$ and $3_2$.

Table 1 shows, for the first and second embodiments, a relative increase ΔI in the intensity detected by the photodetector and by the reference photodetector, in the absence of absorbing gas in the enclosure. The relative increase in relative intensity was defined such that:

$$\Delta I = \frac{I - I_A}{I_A}$$

where I and $I_A$ are an intensity detected by the photodetector in question when a light source according to embodiments of the present disclosure (first embodiment or second embodiment) is employed and an intensity detected by the photodetector in question when a light source according to the prior art (cf. FIG. 2A) is employed, respectively.

TABLE 1

| Embodiment | Measuring photodetector | Reference photodetector |
| --- | --- | --- |
| 1 (FIG. 2G) | 74% | 44% |
| 2 (FIG. 4A) | 146% | −35% |

The results collated in table 1 show that the first embodiment makes it possible to increase the amount of light detected by the measuring photodetector and by the reference photodetector. The second embodiment makes it possible to further increase the amount of light detected by the measuring photodetector (+146%), to the detriment of the amount of light detected by the reference photodetector (−35%).

Given these results, it is considered that the first embodiment is particularly suitable for a gas sensor such as shown in FIG. 1A. The second embodiment seems more suitable for gas-sensor configurations comprising a cylindrical enclosure extending about the transverse axis Z.

The simulations carried out show that the angle of inclination of a peripheral portion, or of each peripheral portion, with respect to the central portion, is preferably comprised between 5° and 30°, and preferably comprised between 5° and 25° or between 5° and 20°.

Figure 7:
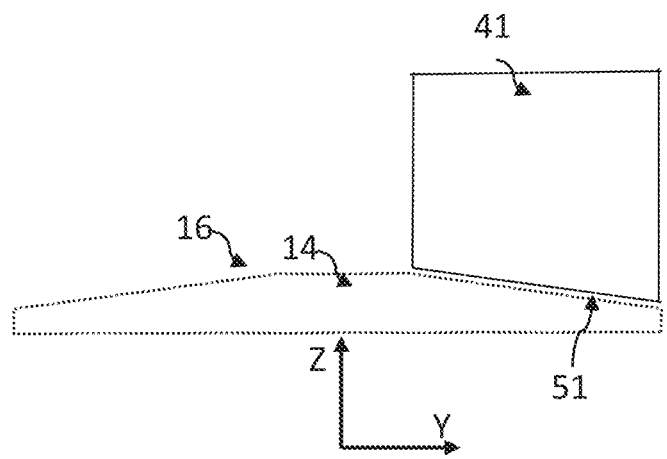
FIG. 7 shows one production process, allowing a light source according to the first embodiment or according to the second embodiment to be obtained.

FIG. 7 schematically shows a process for manufacturing a light source according to the first or second embodiment (cf. FIG. 2C, 2G or 4A). The cover 14 may be machined, cut for example, using a cutting tool 41, so as to form a peripheral portion $16_2$ that is inclined with respect to the central portion $16_1$. The cutting tool comprises a beveled blade 51, allowing the inclination of the peripheral portion $16_2$ to be formed. According to the first embodiment, the cutting tool 41 is translated parallel to the lateral axis X to form the peripheral portions $16_2$. According to the second embodiment, the cutting tool 41 is translated parallel to the lateral axis X to form the first peripheral portions $16_{2,1}$, then parallel to the longitudinal axis Y to form the second peripheral portions $16_{2,2}$. The cutting tool may be a ZH05 Series dicing blade from Disco Corporation (Japan).

Figure 8:
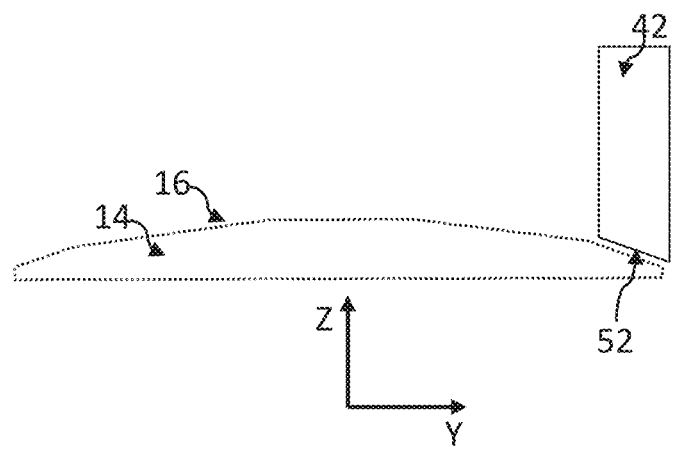
FIG. 8 shows one production process, allowing a light source according to the third embodiment or according to the fourth embodiment to be obtained.

FIG. 8 shows a process for manufacturing a light source according to the third or fourth embodiment (cf. FIG. 5A or 5C). The cover 14 may be machined, cut for example, using a first cutting tool 41 and a second cutting tool 42, so as to form a peripheral portion $16_2$ that is inclined with respect to the central portion $16_1$, by two different angles of inclination. Each cutting tool comprises a blade 51, 52 arranged to form a peripheral portion inclined successively by the angles of inclination $\theta_1$ and $\theta'_1$. First the first cutting tool 41 is used, as shown in FIG. 7, then the second cutting tool 42 is used.

Figure 9:
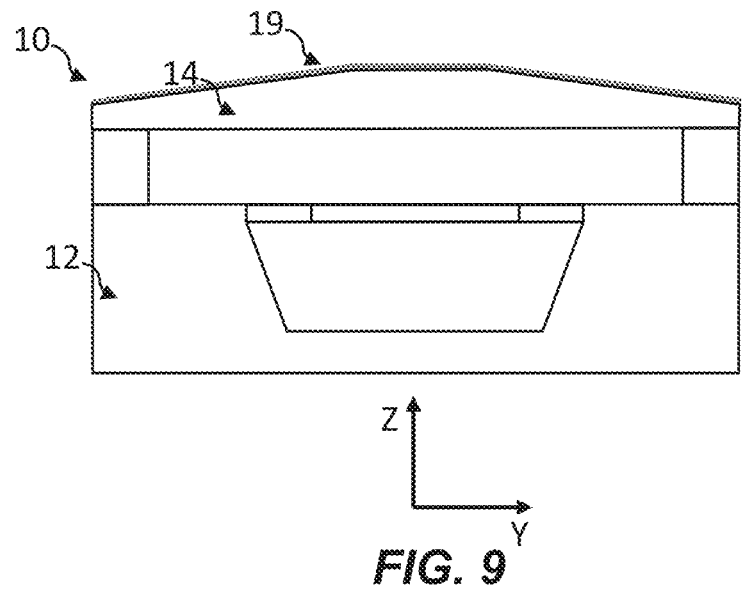
FIG. 9 schematically shows deposition of an anti-reflective coating on a light source according to embodiments of the present disclosure.

FIG. 9 illustrates deposition of an anti-reflective coating 19 on the external face of a light source such as described in connection with the first or third embodiment. On account of the small angles of inclination θ, which are generally smaller than 25°, or even 20°, the inclination of each peripheral face has little effect on the thickness of the anti-reflective coating 19. Considering, for example, an angle of 12°, the thickness on each peripheral portion is 0.98 times the thickness of the anti-reflective coating deposited on the central portion. Thus, the performances of the anti-reflective coating 19 may be considered to be uniform spatially, since the thickness thereof varies little. This conclusion is valid whatever the embodiment, in particular provided that the angle of inclination θ remains sufficiently small, typically smaller than 25° and preferably than 20°.

Figure 10:
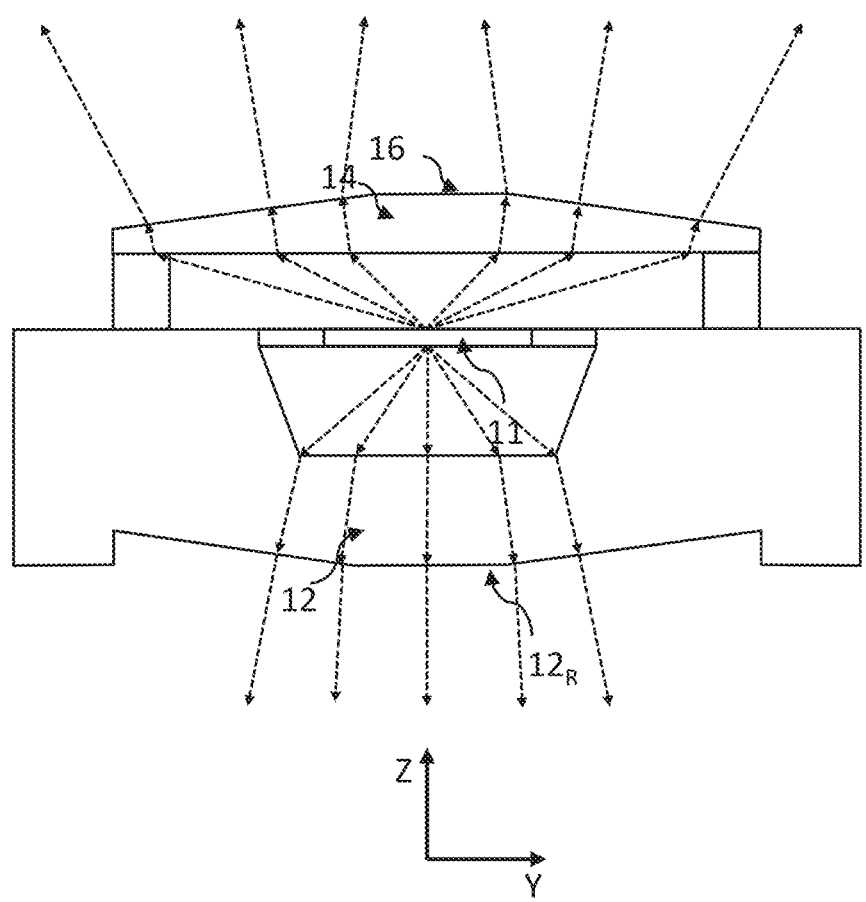
FIG. 10 shows a fifth embodiment of a light source.

FIG. 10 illustrates a fifth embodiment. In this embodiment, the substrate 12 is also structured. The substrate thus comprises a rear external face 12R that is structured in the same way as the external face 16 of the cover 14. The objective is to obtain an increase in the radiation emitted by the source and emerging from the substrate 12 with a low incidence with respect to the transverse axis Z. According to such an embodiment, the light source may be placed in a gas sensor, and the reference photodetector 23 placed facing the substrate 12.

Figure 11A:
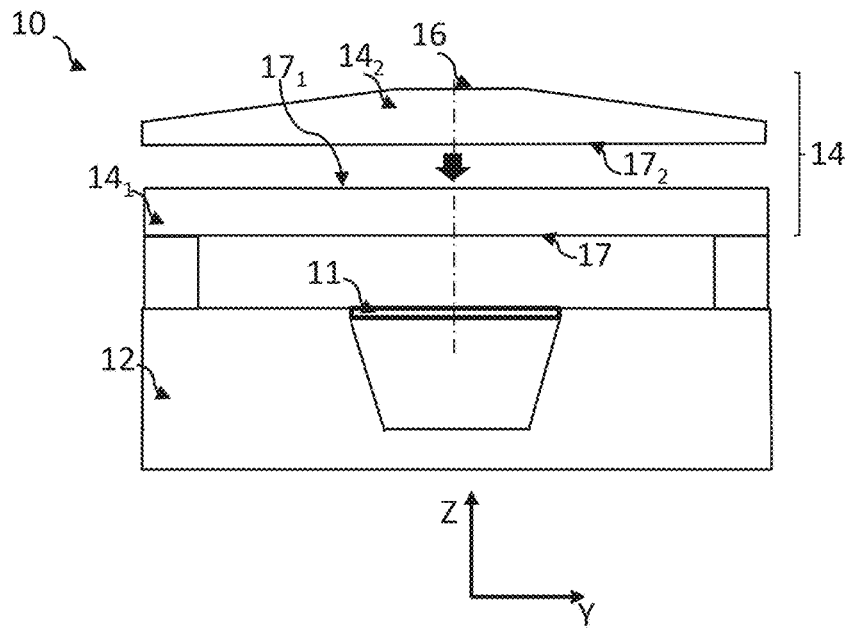
FIG. 11A shows another process allowing a light source according to embodiments of the present disclosure to be obtained.
Figure 11B:
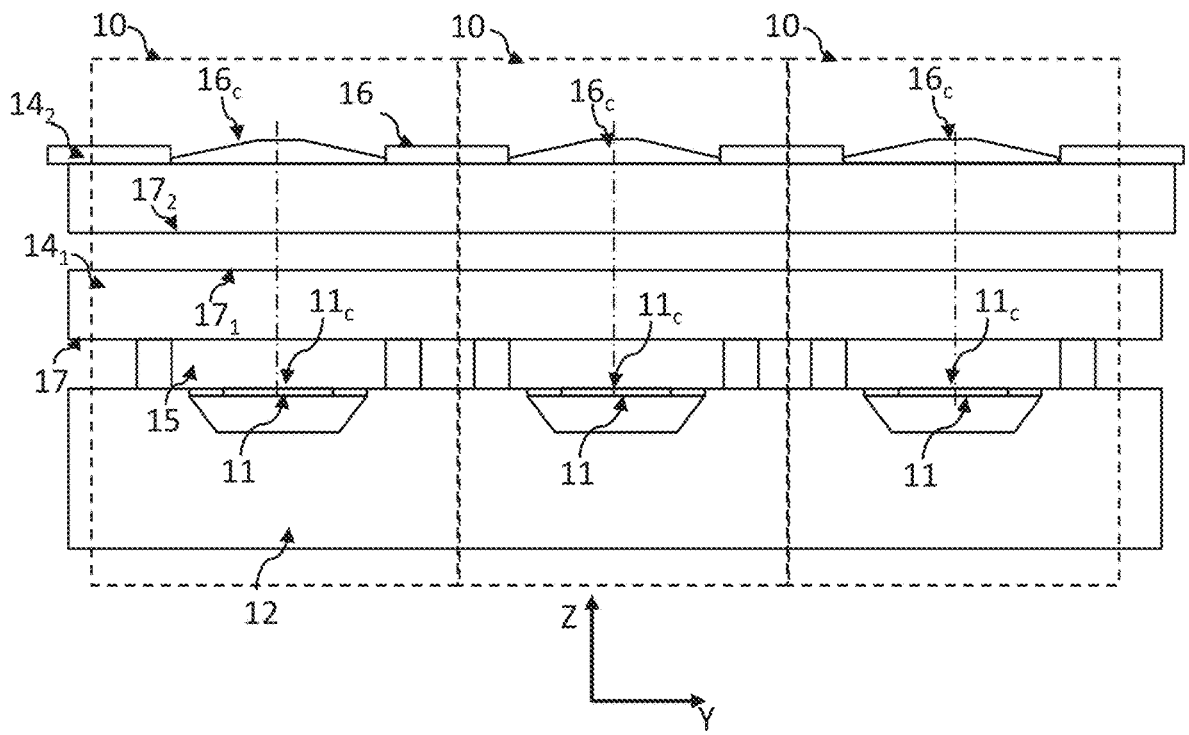
FIG. 11B schematically shows a wafer-level manufacturing process allowing the various light sources according to embodiments of the present disclosure to be manufactured.

FIG. 11A illustrates a manufacturing process, in which the cover 14 comprises a basic cover $14_1$ and an auxiliary cover $14_2$. The basic cover $14_1$ extends between an internal face 17 and a first face $17_1$. The internal face 17 and the first face $17_1$ lie parallel to each other. The basic cover $14_1$ is assembled with a substrate 12, the basic cover and the substrate enclosing a cavity 15 (FIG. 11B) comprising an emitting element 11, a membrane for example. The emitting element extends as a radial plane about a center $11_c$ (FIG. 11B).

The auxiliary cover $14_2$ extends between a second face $17_2$ and an external face 16. The latter is structured about a center $16_c$, as described in connection with the preceding embodiments. The auxiliary cover $14_2$ is then assembled with the basic cover $14_1$, such that the first face $17_1$ is placed against the second face $17_2$. The assembly is carried out in such a way that the center $11_c$ of the emitting element 11 is aligned with the center $16_c$ of the external face, parallel to the transverse axis Z. In FIG. 11A, the alignment has been represented by a dash-dotted line.

The basic cover $14_1$ and the auxiliary cover $14_2$ may be formed from the same material, silicon for example. Alternatively, the auxiliary cover $14_2$ may be formed from a different material to the basic cover $14_1$. The auxiliary cover $14_2$ may, for example, be made of glass, while the basic cover is made of silicon.

When assembled, the auxiliary cover $14_2$ and basic cover $14_1$ together form a cover 14 of the light source 10.

FIG. 11B illustrates a wafer-level process for manufacturing a plurality of light sources according to an embodiment similar to the one described with reference to FIG. 11A. In this process, a basic cover $14_1$ and an auxiliary cover $14_2$ are provided. Just as in the process schematically shown in FIG. 11A, the basic cover $14_1$ extends between an internal face 17 and a first face $17_1$. The internal face 17 and the first face $17_1$ lie parallel to each other. The basic cover $14_1$ is assembled with a substrate 12, the basic cover and the substrate enclosing a plurality of cavities 15, each cavity 15 comprising one emitting element 11, a membrane for example. Each emitting element 11 extends as a radial plane about a center $11_c$. The assembly formed by the basic cover, the substrate 12, the cavity 15 and the membrane 11 corresponds to one basic light source.

The auxiliary cover $14_2$ extends between a second face $17_2$ and an external face 16. The latter is structured about centers 16c that are distinct from one another. The structuring process comprises producing at least one peripheral portion $16_2$ inclined with respect to central portions, which lie parallel to the second face $17_2$, each central portion passing through each center $16_c$, respectively. The auxiliary cover $14_2$ is then assembled with the basic cover $14_1$, such that the first face $17_1$ is placed against the second face $17_2$. The assembly is carried out in such a way that the center $11_c$ of each emitting element is aligned with one center $16_c$ of the external face 16, parallel to the transverse axis Z. In FIG. 11B, the alignment has been represented by a dash-dotted line. Such a process allows a plurality of light sources 10 to be formed simultaneously, the light source being able to be singulated. In FIG. 11B, each light source 10 has been framed by a dashed line.

Figure 12A:
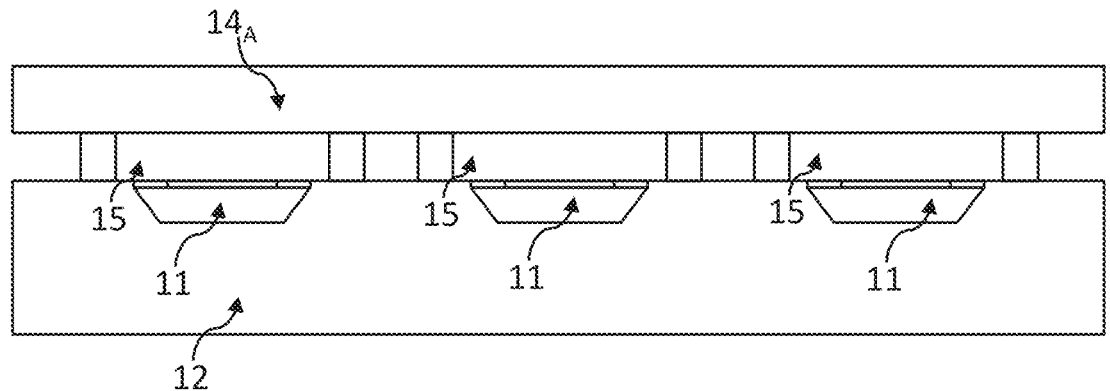
FIGS. 12A, 12B and 12C schematically show a process allowing a light source according to the prior art to be obtained.
Figure 12B:
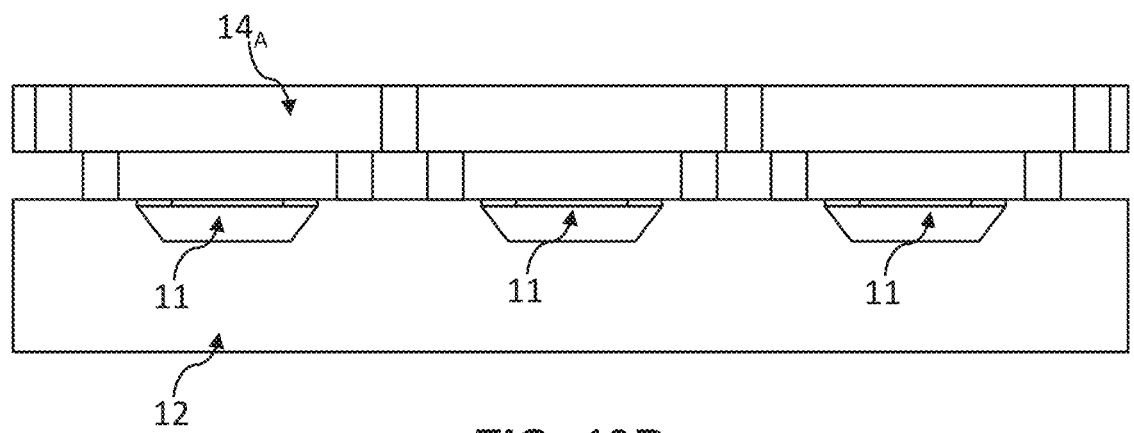
Figure 12C:
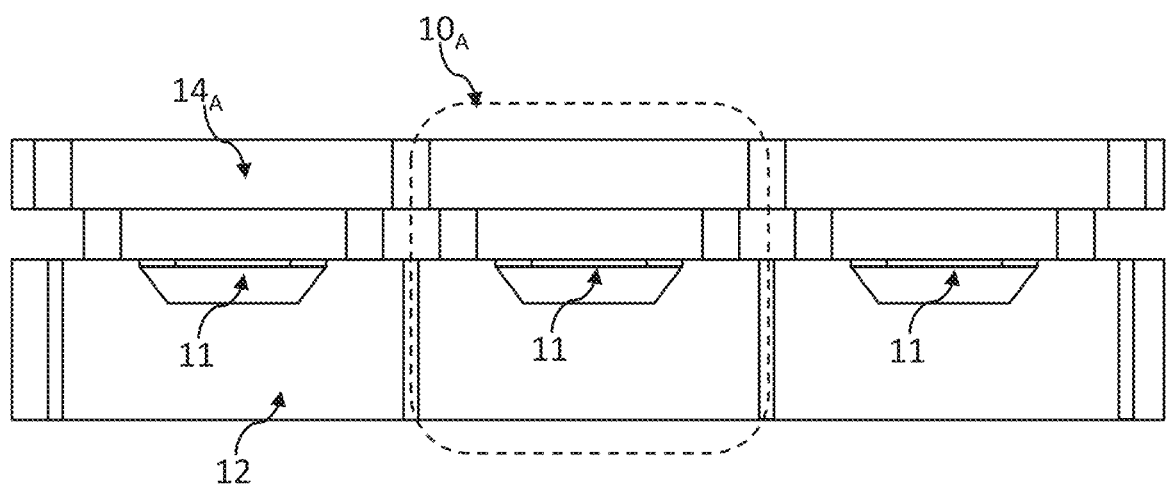

FIGS. 12A to 12C schematically show a wafer-level process for manufacturing light sources $10_A$ according to the prior art, which light sources are referred to as basic light sources. In such a process, each basic light source is formed by an emitting element 11 (notably a membrane), extending as a radial plane, in a cavity 15 bounded by a cover $14_A$ and a substrate 12. The cover $14_A$ extends between two parallel faces. FIGS. 12B and 12C show singulation of each basic light source $10_A$, achieved by cutting the cover $14_A$ (cf. FIG. 12B) then the substrate (FIG. 12C). In FIG. 12C, one light source $10_A$ thus obtained has been framed by a dashed line.

Figure 13A:
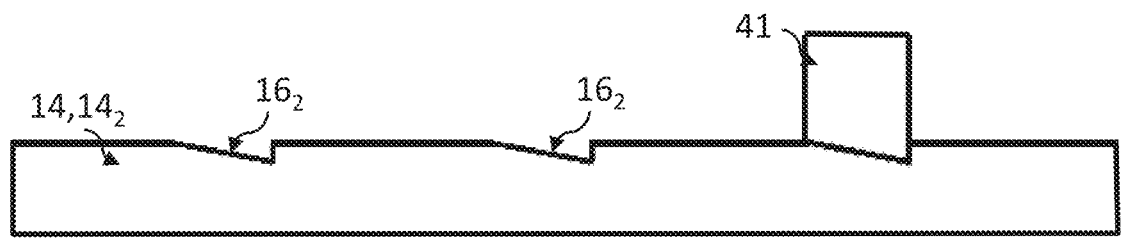
FIGS. 13A to 13D show steps of machining the top cover of a light source.
Figure 13B:
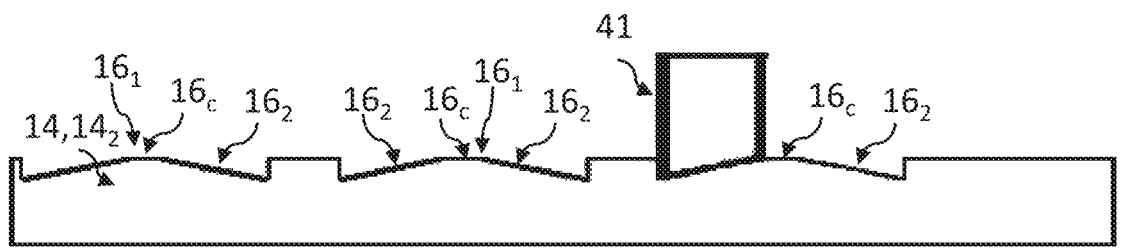
Figure 13C:
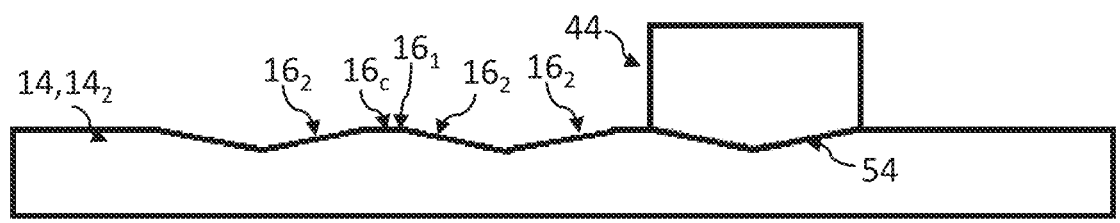

FIGS. 13A to 13C show various ways of structuring an external face 16, the latter possibly being:
an external face of a substrate 14, the latter initially being such as the substrate $14_A$ shown in FIG. 12A;
an external face of an auxiliary substrate (cover) $14_2$, such as described with reference to FIG. 11B.

In FIGS. 13A and 13B, the structuring is carried out using a cutting tool 41, such as described with reference to FIG. 7A. This makes it possible to form, in the same external face, various peripheral portions $16_2$ extending about various central portions $16_1$, respectively.

Figure 13D:
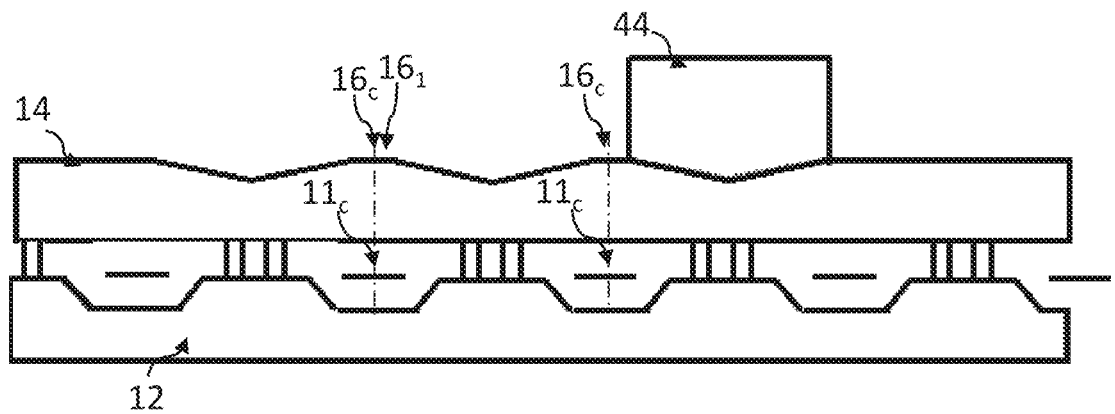

In FIG. 13C, the structuring is carried out using a cutting tool 44 comprising a V-shaped blade 54. This makes it possible to simultaneously form two peripheral portions $16_2$ in the external face. FIG. 13D shows application of a cutting tool 44 to a substrate 14 that initially has a shape corresponding to the substrate $14_A$ shown in FIG. 12A.

The structuring shown in FIGS. 13A to 13C may be carried out on the external face 16 of a cover of the type described with reference to FIG. 11B.

Figure 14A:
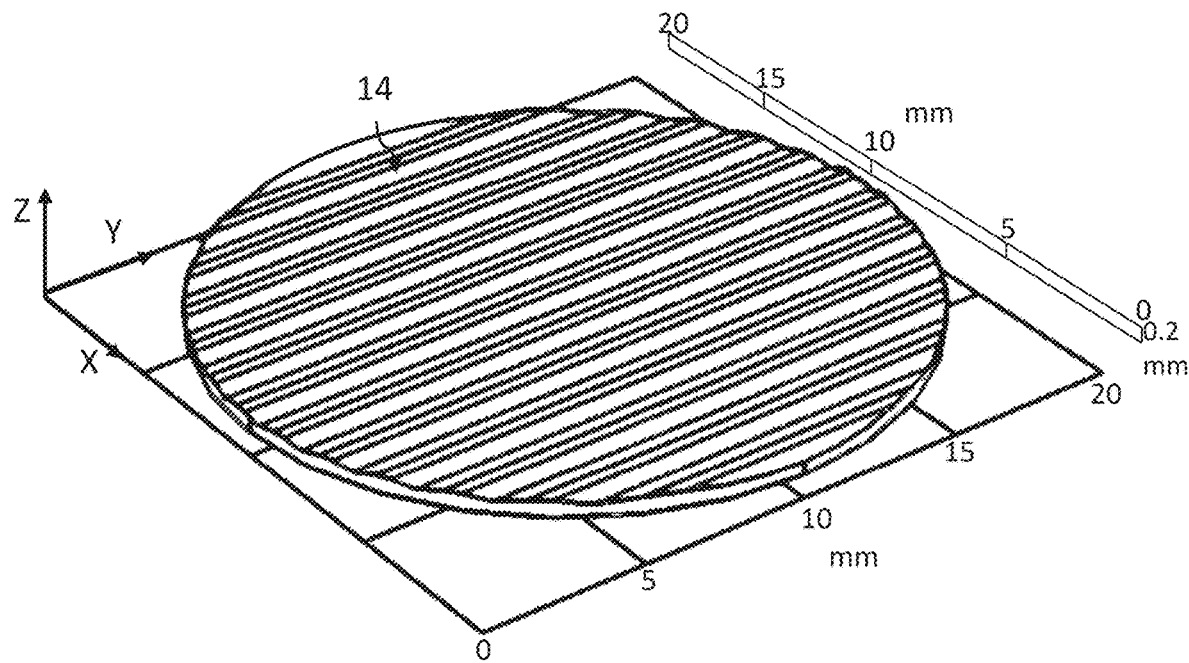
FIGS. 14A and 14B schematically show substrates resulting from a wafer-level formation process and forming the light-source cover according to the first embodiment and the second embodiment, respectively.
Figure 14B:
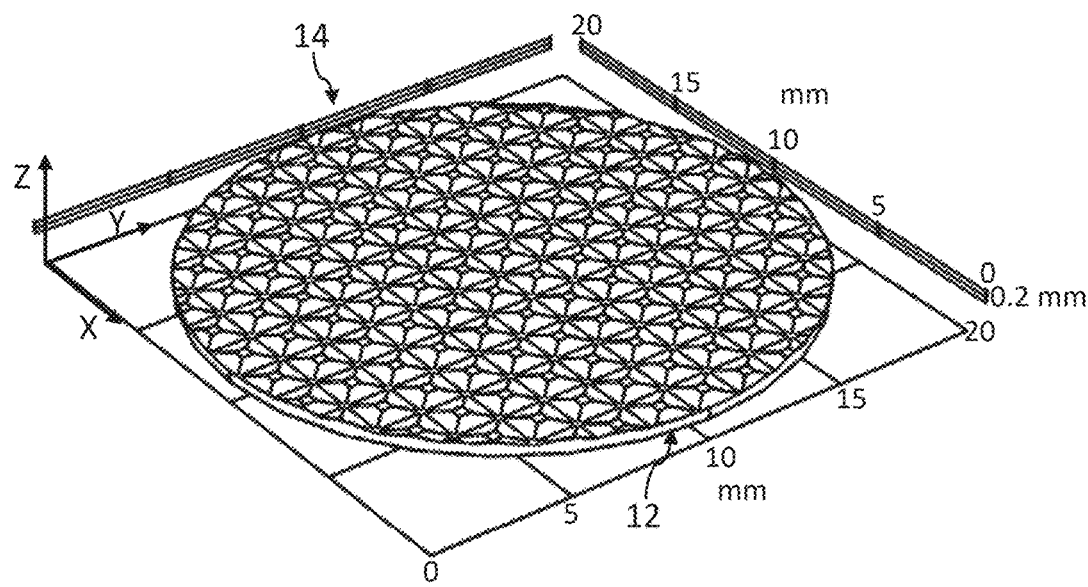

FIGS. 14A and 14B show the result of application of wafer-scale processes for manufacturing light sources 10. The wafer-scale manufacturing processes are those described with reference to FIG. 11B, or 13A to 13D. FIG. 14A shows manufacture of light sources according to the first embodiment. FIG. 14B shows manufacture of light sources according to the second embodiment.

Embodiments of the present disclosure are applicable to light sources for gas sensors, the latter being employable in various fields, for example the field of environmental monitoring, monitoring of atmospheric pollution in particular, or in industry, for example in the chemical industry, petroleum industry, agri-food industry or health industry.

The invention claimed is:

1. An infrared light source, comprising:
   an emitting membrane, extending as a radial plane, about a center of the emitting membrane, the emitting membrane being configured to heat up, so as to emit an infrared light;
   a cavity, in which the emitting membrane lies, the cavity being bounded by a cover, placed facing the emitting membrane, the cover having an internal face, placed facing the emitting membrane, and an external face, defining an interface between the cover and a medium outside the light source;
   the cover occupying, parallel to a transverse axis, perpendicular to the radial plane, a thickness, between the internal face and the external face;
   wherein:
   the external face comprises
      a planar central portion, extending about a center of the external face, the center of the external face being aligned with the center of the emitting membrane along the transverse axis;
      at least one peripheral portion, adjacent to the central portion, the peripheral portion being inclined with respect to the central portion by an angle of inclination;
   such that, in the peripheral portion, the thickness of the cover decreases as a function of a distance from the central portion.

2. The light source of claim 1, wherein the peripheral portion lies on either side of the central portion.

3. The light source of claim 1, wherein the peripheral portion is inclined, with respect to the central portion, by an angle of inclination comprised between 5° and 30°.

4. The light source of claim 1, wherein:
   the central portion lies parallel to a longitudinal axis and to a lateral axis, the longitudinal axis being perpendicular to the lateral axis;
   the peripheral portion lies parallel to a first longitudinal axis and to a first lateral axis;
   the first longitudinal axis is inclined, by the angle of inclination, with respect to the longitudinal axis; and
   the first lateral axis is parallel to the lateral axis.

5. The light source of claim 4, comprising a second peripheral portion, adjacent to the central portion, such that:
   the second peripheral portion lies parallel to a second longitudinal axis and a second lateral axis;
   the second lateral axis is inclined, by a second angle of inclination, with respect to the lateral axis; and
   the second longitudinal axis is parallel to the longitudinal axis.

6. The light source of claim 1, wherein the peripheral portion extends a length comprised between 5% and 50% of a length of the cover, said length of the peripheral portion being measured parallel to the lateral axis or to the longitudinal axis.

7. The light source of claim 1, wherein at least one peripheral portion is inclined, with respect to the central portion, by various angles of inclination, the angles of inclination increasing with distance from the central portion.

8. The light source of claim 1, wherein the central portion is centered with respect to the emitting membrane, along the transverse axis.

9. The light source of claim 1, wherein the external face extends, along an axis parallel to the radial plane, a length comprised between 500 µm and 2500 µm.

10. A gas sensor, comprising an enclosure configured to contain a gas, a light source and at least one photodetector, the light source being configured to emit light radiation that propagates, through the enclosure, to the photodetector, the light source being the light source of claim 1.

11. The gas sensor of claim 10, wherein the enclosure is bounded by at least a first reflective wall, which lies perpendicular to the radial plane of the light source, parallel to the transverse axis.

12. The gas sensor of claim 11, wherein the external face of the cover of the light source comprises a planar central portion, extending as a plane parallel to the radial plane and passing through the center of the external face, and wherein:
    the central portion lies parallel to a longitudinal axis and to a lateral axis, the longitudinal axis being perpendicular to the lateral axis;
    the peripheral portion lies parallel to a first longitudinal axis and to a first lateral axis;
    the first longitudinal axis is inclined, by an angle of inclination, with respect to the longitudinal axis;
    the first lateral axis is parallel to the lateral axis;
the light source being arranged such that the longitudinal axis is perpendicular to the first reflective wall.

13. The gas sensor of claim 10, wherein the enclosure is bounded by a second reflective wall, lying parallel to the first reflective wall, the light source lying between the first and second reflective walls.

14. The gas sensor of claim 13, wherein the center of the emitting membrane of the light source is located at an equal distance from each reflective wall.

15. A method for producing the light source of claim 1, comprising:
    a) obtaining an initial light source, the initial light source comprising an emitting membrane, lying parallel to a radial plane, and placed in a cavity bounded by a cover, the cover extending between an internal face, placed facing the emitting membrane, and an external face, the external face lying parallel to the radial plane, about a center, the distance between the internal face and the external face defining a thickness of the cover;
    b) machining the external face, so as to form, in the external face, at least one peripheral portion, adjacent to a planar central portion, passing through the center of the external face, and parallel to the radial plane, the peripheral portion being inclined with respect to the central portion such that, in the peripheral portion, the thickness of the cover decreases as a function of a distance from the center of the external face.

16. The method of claim 15, wherein the machining comprises applying a cutting tool comprising a blade that is inclined with respect to the radial plane, against the external face of the cover.

17. The method of claim 16, comprising translating the cutting tool with respect to the external face.

18. The method of claim 17, comprising successively using a plurality of cutting tools, each cutting tool comprising a blade that is inclined with respect to the radial plane by one angle of inclination, the angles of inclination of two different cutting tools being different.

19. The method of claim 15, wherein:
    step a) comprises obtaining a plurality of initial light sources, such that the respective emitting membranes of each initial light source are coplanar, and extend into one cavity, respectively, the respective cavities of each initial light source being bounded by the same cover, each cavity being centered with respect to a center of the external face;
    step b) is implemented about each center of the external face, so as to form, beside each center, at least one peripheral portion, adjacent to a planar central portion, passing through said center of the external face, and parallel to the radial plane, the peripheral portion being inclined with respect to the central portion such that, in the peripheral portion, the thickness of the cover decreases as a function of a distance from the center of the external face.

20. A method for producing a light source, comprising:
    i) obtaining a basic light source, the basic light source comprising an emitting membrane that extends, parallel to a radial plane, about a center of the emitting membrane, and that is placed in a cavity bounded by a basic cover, the basic cover extending between an internal face, placed facing the emitting membrane, and a first face, the first face of the basic cover lying parallel to the radial plane;
    ii) obtaining an auxiliary cover, extending between a second face and an external face, a distance between the second face and the first face defining a thickness of the auxiliary cover, the external face comprising at least one center of the external face;
    iii) machining the external face of the auxiliary cover, so as to form, in the external face, at least one peripheral portion, adjacent to a planar central portion, the central portion passing through the center of the external face, and being parallel to the second face, the peripheral portion being inclined with respect to the central portion such that, in the peripheral portion, the thickness of the auxiliary cover decreases as a function of a distance from the center of the external face; and
    iv) assembling the auxiliary cover against the basic cover, the second face making contact with the first face, the assembly being carried out in such a way that the center of the external face is aligned with the center of the emitting membrane, parallel to a transverse axis perpendicular to the radial plane.

* * * * *